(12) United States Patent
Fujii et al.

(10) Patent No.: US 7,530,602 B2
(45) Date of Patent: May 12, 2009

(54) DOUBLE-PIPE JOINT

(75) Inventors: Tatsuya Fujii, Sanda (JP); Makoto Fujii, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 342 days.

(21) Appl. No.: 11/329,767

(22) Filed: Jan. 11, 2006

(65) Prior Publication Data
US 2006/0157975 A1 Jul. 20, 2006

(30) Foreign Application Priority Data
Jan. 17, 2005 (JP) ............................. 2005-008670
Jan. 20, 2005 (JP) ............................. 2005-012541

(51) Int. Cl.
*F16L 19/00* (2006.01)
(52) U.S. Cl. .................. 285/123.15; 285/247; 285/332; 285/423
(58) Field of Classification Search ............ 285/123.15, 285/123.3, 247, 332, 332.1, 334.5, 130.1, 285/423, 332.2
See application file for complete search history.

(56) References Cited

U.S. PATENT DOCUMENTS 5,388,871 A * 2/1995 Saitoh ......................... 285/247
5,743,572 A * 4/1998 Nishio ......................... 285/331
6,045,164 A * 4/2000 Nishio ......................... 285/331
6,089,621 A * 7/2000 Nishio ......................... 285/331
6,513,839 B2* 2/2003 Nishio ......................... 285/331
6,517,123 B2* 2/2003 Nishio ......................... 285/331
2002/0180211 A1* 12/2002 Nishio ......................... 285/331

FOREIGN PATENT DOCUMENTS

JP 06-129575 5/1994
JP 2001-235080 8/2001

* cited by examiner

Primary Examiner—Aaron M Dunwoody
Assistant Examiner—Fannie Kee
(74) Attorney, Agent, or Firm—William L. Androlia; H. Henry Koda

(57) ABSTRACT

In a double-pipe joint for connecting and coupling a double pipe consisting of outer and inner pipes made of a resin tube, an inner joint portion for coupling the inner pipe formed by: a sleeve which is to be pressingly fitted into an inner-pipe end portion; an inner-pipe joint body which is to be fitted onto the end portion; and an inner-pipe union nut, and an outer joint portion for coupling the outer pipe formed by: a sleeve which is to be pressingly fitted into an outer-pipe end portion; an outer-pipe joint body which is to be fitted onto the end portion; and an outer-pipe union nut. The inner-pipe union nut and the outer-pipe joint body are formed integrally into a nut-equipped body.

3 Claims, 24 Drawing Sheets

DOUBLE-PIPE JOINT

BACKGROUND OF THE INVENTION

1. Field of the Invention

The present invention relates to a joint for connecting and coupling a double pipe which consists of an inner pipe for transporting a fluid, and an outer pipe that covers the inner pipe for the purpose of prevention of leakage or the like, i.e., a double-pipe joint.

2. Explanation of Related Art

As means for connecting a pipe for transporting a fluid to a fluid apparatus such as a valve or a pump, or to a similar pipe, usually, a pipe joint is used as disclosed in Japanese Patent Application Laying-Open No. 6-129575. Such a pipe joint is requested to have a function of connecting a pipe to a joint body so as not to cause leakage of a fluid flowing through the pipe. The pipe joint disclosed in Japanese Patent Application Laying-Open No. 6-129575 is configured so that a union nut is screwed with a joint body into which a pipe made of a synthetic resin is fitted, whereby a diameter-increased pipe end portion can be connected in a locked state.

For example, as means for protecting a pipe or a pipe joint to which the pipe is connected from a damage due to a collision against another article, or means for preventing a fluid from leaking in the case where a crack or a damage is produced by any cause, it is contemplated to dispose an outer pipe which surrounds the pipe or the pipe joint, and an outer-pipe joint for connecting and coupling the outer pipe. In this contemplation, it is required that the pipe is formed by a double pipe consisting of an inner pipe for transporting a fluid, and an outer pipe for protecting the inner pipe, and the pipe joint is formed by a joint for a double pipe, i.e., a double pipe joint which comprises a joint for the inner pipe and that for the outer pipe.

With respect to such a double pipe joint, for example, a joint disclosed in Japanese Patent Application Laying-Open No. 2001-235080 serves as a reference. The publication discloses a structure in which an inner pipe and an inner-pipe joint are covered by an outer pipe and an outer-pipe joint, thereby protecting the inner pipe and the inner-pipe joint. The inner-pipe joint and the outer-pipe joint are separately configured, and formed as structure members which are independent from each other. However, the means disclosed in Japanese Patent Application Laying-Open No. 2001-235080 has a structure in which the inner-pipe joint and the outer-pipe joint do not interfere with each other. In order to hold the inner-pipe joint to a predetermined position or posture, therefore, it is necessary to use a double pipe having a special structure in which the inner pipe is supported by the outer pipe as disclosed in FIG. 5 of Japanese Patent Application Laying-Open No. 2001-235080. This is disadvantageous in cost, and also in that the diameter of the doubled pipe joint portion is significantly large (the size is increased).

In the case where a double pipe consisting of two or inner and outer pipes is used in piping for the purpose of concurrently flowing two different kinds of fluids or protecting a pipe for transporting a fluid, it is preferably to employ a useful double-pipe joint having an advantage that it has a function of supporting the inner and outer pipes in a predetermined relative positional relationship, or that the whole pipe joint is compactified. Therefore, a double-pipe joint having such an advantage is desired.

SUMMARY OF THE INVENTION

In view of the above-discussed situations, it is an object of the invention to provide an improved double-pipe joint in which an outer-pipe joint for a protection pipe or the like is integrated with a pipe joint (inner-pipe joint) for transporting a fluid, and which can be compactified. It is another object of the invention to enable a double pipe having the above-mentioned various advantages as a pipe for transporting a fluid, to be easily employed.

In the invention, a double-pipe joint has an inner joint portion and an outer joint portion, the inner joint portion having: an inner-pipe receiving port for receiving an inner-pipe end portion of an inner-pipe joint body in an inward fitting state; a cylindrical inner-pipe sleeve which is to be pressingly inserted and fitted into the inner-pipe end portion; an inner-pipe union nut which is to be fitted onto the inner-pipe end portion, and which is screwable with the inner-pipe receiving port; an inner-pipe sealing face which is formed in the inner-pipe receiving port; and an inner-pipe sealing portion which is formed by pressing the inner-pipe end portion from an outer side by fastening due to screw advancement of the inner-pipe union nut toward the inner-pipe receiving port, and causing by the pressing function the inner-pipe end portion and the inner-pipe sealing face to be in close contact with each other, the inner joint portion being to be used for connecting and coupling an inner pipe of a double pipe to the inner-pipe joint body, the double pipe comprising an outer pipe which is made of a synthetic resin, and the inner pipe which is disposed inside the outer pipe, and which is made of a synthetic resin, the outer joint portion having: an outer-pipe receiving port for receiving an outer-pipe end portion in an outer-pipe joint body in an inward fitting state; a cylindrical outer-pipe sleeve which is to be pressingly inserted and fitted into the outer-pipe end portion; an outer-pipe union nut which is screwable with the outer-pipe receiving port while being fitted onto the outer-pipe end portion; an outer-pipe sealing face which is formed in the outer-pipe receiving port; and an inner-pipe sealing portion which is formed by pressing the inner-pipe end portion from an outer side by fastening due to screw advancement of the inner-pipe union nut toward the inner-pipe receiving port, and causing by the pressing function the inner-pipe end portion and the inner-pipe sealing face to be in close contact with each other, the outer joint portion being used for connecting and coupling the outer pipe to the outer-pipe joint body with which the inner-pipe union nut is formed integrally.

According to the invention, both the inner and outer joint portions have the structure in which the sealing is obtained by pressingly contacting the outer periphery with the joint body that is fitted in a state where the inner side is supported by the sleeve pressingly inserted into the inner or outer pipe. By fastening of the inner-pipe union nut, the ends of the inner and outer pipes can be connected and coupled to inner and outer joint members while sealing the ends in a more liquid-tight state. The outer-pipe joint body which is a component of the outer joint portion functions also as the inner-pipe union nut which is a component of the inner joint portion. Therefore, decrease of the number of components and cost reduction are enabled by sharing of components, the inner and outer joint portions are organically integrated with each other, and the whole joint can be compactified. The inner and outer joint portions are provided with a function of supporting the inner and outer pipes in a predetermined positional relationship, such as that of coaxially holding the inner and outer pipes. Depending on the length or the like, therefore, a special double pipe in which inner and outer pipes support each other is not required. As a result, it is possible to provide an improved double-pipe joint in which an outer-pipe joint serving as a protection pipe is integrated with a pipe joint (inner-pipe joint) for transporting a fluid, and cost reduction and compactification are enabled. Consequently, there is an advantage that a double pipe which has various merits as a pipe for transporting a fluid can be easily employed.

In the invention, in the double-pipe joint, the inner-pipe sleeve has: a press-insertion portion onto which the end portion of the inner pipe is to be pressingly inserted to increase a diameter of the end portion, thereby expanding the end portion so as to have a mountain-like section shape; an annular protrusion which is to be pressingly inserted into an annular groove formed in an outer diameter side of a fluid path in the inner-pipe joint body; and a tapered outer peripheral face which is to be in press contact with a forward-expanded tapered inner peripheral face formed in a tip end portion of a cylindrical join end portion that is a portion between the annular groove and the fluid path, the inner-pipe sealing portion is formed to, by the inner-pipe sealing face configured by a forward-expanded outward taper face formed in a tip end portion of the inner-pipe receiving port, and a forward-expanded inward taper face in the press-insertion portion having a mountain-like section shape, pressingly hold the end portion of the inner pipe in an inclined state between the inner-pipe sealing face and the inward taper face, and the pipe joint further has: a second inner-pipe sealing portion which is configured in a freely formable manner by fitting between the annular groove and the annular protrusion; and a third inner-pipe sealing portion which is configured in a freely formable manner by pressing contact between the tapered inner peripheral face and the tapered outer peripheral face.

According to the invention, the second sealing portion is formed by radially pressingly inserting the annular protrusion into the annular groove, and hence there is an advantage that an effective sealing effect is maintained even when the fastening force of the inner-pipe union nut is slightly lowered. In the third sealing portion, the tapered faces are caused to butt against each other by the pressure due to the press insertion of the annular protrusion into the annular groove, while preventing the join end portion of the inner-pipe joint body from inclinedly deforming toward the inner diameter side. Consequently, there is an advantage that the inclinedly deforming force can be effectively used as the pressingly contacting force between the taper faces, and the sealing property can be rationally enhanced. As a result, in the inner joint portion, the second and third sealing portions are formed over the projection portion of the inner-pipe sleeve and the inner-pipe joint body. Therefore, it is possible to provide a double-pipe joint which can stably connect and couple an inner pipe while preventing liquid leakage from occurring by three sealing portions in total.

In the invention, in the double-pipe joint, the inner-pipe sleeve has: a press-insertion portion onto which the end portion of the inner pipe is to be pressingly inserted to increase a diameter of the end portion, thereby expanding the end portion so as to have a mountain-like section shape; and a projection portion in which a forward-expanded tapered inner peripheral face is formed in an inner end, the inner peripheral face being to be in press contact with a forward-contracted tapered outer peripheral face of an annular protrusion which has the forward-contracted tapered outer peripheral face in a tip end, the tapered outer peripheral face being formed on an outer diameter side of a fluid path of the inner-pipe joint body, the inner-pipe sealing portion is formed to, by the inner-pipe sealing face configured by a forward-expanded outward taper face formed in a tip end portion of the inner-pipe receiving port, and a forward-expanded inward taper face in the press-insertion portion having a mountain-like section shape, pressingly hold the end portion of the inner pipe in an inclined state between the inner-pipe sealing face and the inward taper face, and the pipe joint further has a second inner-pipe sealing portion which is configured in a freely formable manner by pressing contact between the tapered inner peripheral face and the tapered outer peripheral face.

According to the invention, sealing is performed while the taper faces of the inner-pipe sleeve and the inner-pipe joint body are effectively pressingly contacted with each other by the pressing force toward the axis of the inner-pipe sleeve due to the fastening of the inner-pipe union nut. Moreover, there is a preferable effect of preventing a disadvantage that an inner end portion of the inner-pipe sleeve is deformed in the inner diameter direction by the pressing force, from occurring. As a result, in the inner joint portion, the second sealing portion is formed over the projection portion of the inner-pipe sleeve and the inner-pipe joint body, and it is possible to provide a double-pipe joint which can connect and couple an inner pipe while preventing liquid leakage from occurring by two sealing portions in total.

In the invention, in the double-pipe joint, the outer-pipe sleeve has: a press-insertion portion onto which the end portion of the outer pipe is to be pressingly inserted and fitted to increase a diameter of the end portion, thereby expanding the end portion so as to have a mountain-like section shape; an annular protrusion which is to be pressingly inserted into an annular groove formed in an outer diameter side of an inner-pipe passing path in the outer-pipe joint body; and a tapered outer peripheral face which is in press contact with a forward-expanded tapered inner peripheral face formed in a tip end portion of a cylindrical join end portion that is a portion between the annular groove and the inner-pipe passing path, the outer-pipe sealing portion is formed to, by the outer-pipe sealing face configured by a forward-expanded outward taper face formed in a tip end portion of the outer-pipe receiving port, and a forward-expanded inward taper face in the press-insertion portion having a mountain-like section shape, pressingly hold the end portion of the outer pipe in an inclined state between the outer-pipe sealing face and the inward taper face, and the pipe joint further has: a second outer-pipe sealing portion which is configured in a freely formable manner by fitting between the annular groove and the annular protrusion; and a third outer-pipe sealing portion which is configured in a freely formable manner by pressing contact between the tapered inner peripheral face and the tapered outer peripheral face.

According to the invention, the second sealing portion is formed by radially pressingly inserting the annular protrusion into the annular groove, and hence there is an advantage that an effective sealing effect is maintained even when the fastening force of the outer-pipe union nut is slightly lowered. In the third sealing portion, the tapered faces are caused to butt against each other by the pressure due to the press insertion of the annular protrusion into the annular groove, while preventing the join end portion of the outer-pipe joint body from inclinedly deforming toward the inner diameter side. Consequently, there is an advantage that the inclinedly deforming force can be effectively used as the pressingly contacting force between the taper faces, and the sealing property can be rationally enhanced. As a result, in the outer joint portion, the second and third sealing portions are formed over the projection portion of the outer-pipe sleeve and the outer-pipe joint body. Therefore, it is possible to provide a double-pipe joint which can stably connect and couple an outer pipe while preventing liquid leakage from occurring by three sealing portions in total.

In the invention, in the double-pipe joint, the outer-pipe sleeve has: a press-insertion portion onto which the end portion of the outer pipe is to be pressingly inserted to increase a diameter of the end portion, thereby expanding the end portion so as to have a mountain-like section shape; and a projection portion in which a forward-expanded tapered inner peripheral face is formed in an inner end, the inner peripheral face being to be in press contact with a forward-contracted tapered outer peripheral face of an annular protrusion which has the tapered outer peripheral face in a tip end, the forward-contracted tapered outer peripheral face being formed on an outer diameter side of an inner-pipe passing path of the outer-pipe joint body, the outer-pipe sealing portion is formed to, by the outer-pipe sealing face configured by a forward-expanded outward taper face formed in a tip end portion of the outer-pipe receiving port, and a forward-expanded inward taper face in the press-insertion portion having a mountain-like section shape, pressingly hold the end portion of the outer pipe in an inclined state between the outer-pipe sealing face and the inward taper face, and the pipe joint further has a second outer-pipe sealing portion which is configured in a freely formable manner by pressing contact between the tapered inner peripheral face and the tapered outer peripheral face.

According to the invention, sealing is performed while the taper faces of the outer-pipe sleeve and the outer-pipe joint body are effectively pressingly contacted with each other by the pressing force toward the axis of the outer-pipe sleeve due to the fastening of the outer-pipe union nut. Moreover, there is a preferable effect of preventing a disadvantage that an inner end portion of the outer-pipe sleeve is deformed in the inner diameter direction by the pressing force, from occurring. As a result, in the outer joint portion, the second sealing portion is formed over the projection portion of the outer-pipe sleeve and the outer-pipe joint body, and it is possible to provide a double-pipe joint which can connect and couple an outer pipe while preventing liquid leakage from occurring by two sealing portions in total.

In the invention, in the double-pipe joint, the inner-pipe joint body for connecting and coupling double pipes with each other has:

the inner-pipe receiving ports which are formed in ends of the joint body, respectively;

a pair of the inner joint portions which use the inner-pipe receiving ports, respectively; and a pair of the outer joint portions.

According to the invention, the inner and outer joint portions are configured in the both ends of the inner-pipe joint body, respectively. Therefore, it is possible to provide a double-pipe joint which exerts any one of the above-mentioned effects of the invention, as a joint which can suitably connect and coupe double pipes with each other.

In the second invention, a double-pipe joint has an inner joint portion and an outer joint portion, the inner joint portion having: an inner-pipe receiving port for receiving an inner-pipe end portion of an inner-pipe joint body in an inward fitting state; a cylindrical inner-pipe sleeve which is to be pressingly inserted and fitted into the inner-pipe end portion; an inner-pipe union nut which is to be fitted onto the inner-pipe end portion, and which is screwable with the inner-pipe receiving port; and an inner-pipe sealing face which is formed in the inner-pipe receiving port, the inner joint portion being configured to form an inner-pipe sealing portion by pressing the inner-pipe end portion from an outer side by fastening due to screw advancement of the inner-pipe union nut toward the inner-pipe receiving port, and causing by the pressing function the inner-pipe end portion and the inner-pipe sealing face to be in close contact with each other, the inner joint portion being to be used for connecting and coupling an inner pipe of a double pipe to the inner-pipe joint body, the double pipe comprising the inner pipe which is made of a synthetic resin, and an outer pipe which is disposed outside the inner pipe, the outer joint portion having: an outer-pipe receiving port for receiving an outer pipe in an outer-pipe joint body in an inward fitting state which is screwable with the inner-pipe joint body in a state of surrounding the inner-pipe union nut screwed with the inner-pipe receiving port; an outer-pipe sleeve which is inserted onto or into the outer pipe; and an outer-pipe union nut which is fitted onto the outer pipe, and which is screwable with the outer-pipe receiving port, the outer joint portion being configured to cooperate with the outer-pipe sleeve to cause the outer pipe and the outer-pipe joint body to be in close contact with each other, by fastening due to screw advancement of the outer-pipe union nut toward the outer-pipe receiving port, the outer joint portion being to be used for connecting and coupling the outer pipe to the outer-pipe joint body.

According to the invention, the inner joint portion has the sealing structure in which the joint body is fitted onto and pressingly contacted with the inner pipe into which a sleeve is fitted in a state where the inner side is supported in terms of strength. By fastening of the inner-pipe union nut, therefore, the end of the inner pipe through which a fluid actually flows can be connected and coupled to the inner-pipe joint body while sealing the end in a more liquid-tight state. The inner-pipe joint body which is a main component of the inner joint portion is in a state where it is internally disposed in the outer-pipe joint body, and hence the outer-pipe joint body functions as a guard member for protecting the inner joint portion through which a fluid flows. The outer-pipe joint body which is a component of the outer joint portion, and the inner-pipe joint body which is a component of the inner joint portion are screwable with each other. While the pipe joint can be assembled and disassembled in a relatively easy manner, they are screwed with each other in an assembled state, and the inner and outer joint portions are organically integrated with each other. Therefore, the whole joint can be compactified as compared with the case where they are independently configured. The inner and outer joint portions are provided with a function of supporting the inner and outer pipes in a predetermined positional relationship, such as that of coaxially holding the inner and outer pipes. Therefore, a special double pipe in which inner and outer pipes support each other is not required.

As a result, it is possible to provide an improved double-pipe joint in which an outer-pipe joint serving as a protection pipe is substantially integrated with a pipe joint (inner-pipe joint) for transporting a fluid, and compactification is enabled, and the inner joint portion is protected by the outer-pipe joint body to provide a more excellent sealing property. Consequently, there is an advantage that a double pipe which has various merits as a pipe for transporting a fluid can be easily employed.

In the invention, in the double-pipe joint of the second invention, the outer-pipe joint body screwed with the inner-pipe joint body, and the inner-pipe union nut screwed with the inner-pipe receiving port are set to be in a positional relationship in which the outer-pipe joint body and the inner-pipe union nut are close to each other in a radial direction within a relative rotatable range.

According to the invention, the outer-pipe joint body and the inner-pipe union nut are set to be in a positional relationship in which they are close to each other in a radial direction within a relative rotatable range. Although detail description is made in the paragraph of embodiments, when an external force of bending or the like acts on the double-pipe joint, therefore, the inner-pipe union nut functions as a member for supporting from the inner side, and restricts or blocks the bending deformation of the outer-pipe joint body. Consequently, there is an advantage that a damage of the double-pipe joint can be prevented from occurring.

In the invention, in the double-pipe joint of the second invention, the inner-pipe sleeve has: a press-insertion portion onto which the end portion of the inner pipe is to be pressingly inserted to increase a diameter of the end portion, thereby expanding the end portion so as to have a mountain-like section shape; an annular protrusion which is to be pressingly inserted into an annular groove formed in an outer diameter side of a fluid path in the inner-pipe joint body; and a tapered outer peripheral face which is to be in press contact with a forward-expanded tapered inner peripheral face formed in a tip end portion of a cylindrical join end portion that is a portion between the annular groove and the fluid path, the inner-pipe sealing portion is formed to, by the inner-pipe sealing face configured by a forward-expanded outward taper face formed in a tip end portion of the inner-pipe receiving port, and a forward-expanded inward taper face in the press-insertion portion having a mountain-like section shape, pressingly hold the end portion of the inner pipe in an inclined state between the inner-pipe sealing face and the inward taper face, and the pipe joint further has: a second inner-pipe sealing portion which is configured in a freely formable manner by fitting between the annular groove and the annular protrusion; and a third inner-pipe sealing portion which is configured in a freely formable manner by pressing contact between the tapered inner peripheral face and the tapered outer peripheral face.

According to the invention, the second sealing portion is formed by radially pressingly inserting the annular protrusion into the annular groove, and hence there is an advantage that an effective sealing effect is maintained even when the fastening force of the inner-pipe union nut is slightly lowered. In the third sealing portion, the tapered faces are caused to butt against each other by the pressure due to the press insertion of the annular protrusion into the annular groove, while preventing the join end portion of the inner-pipe joint body from inclinedly deforming toward the inner diameter side. Consequently, there is an advantage that the inclinedly deforming force can be effectively used as the pressingly contacting force between the taper faces, and the sealing property can be rationally enhanced. As a result, in the inner joint portion, in addition to the inner-pipe sealing portion, the second and third sealing portions are formed over the projection portion of the inner-pipe sleeve and the inner-pipe joint body. Therefore, it is possible to provide a double-pipe joint which can stably connect and couple an inner pipe while preventing liquid leakage from occurring by three sealing portions in total.

In the invention, in the double-pipe joint of the second invention, the inner-pipe sleeve has: a press-insertion portion onto which the end portion of the inner pipe is to be pressingly inserted to increase a diameter of the end portion, thereby expanding the end portion so as to have a mountain-like section shape; and a projection portion in which a forward-expanded tapered inner peripheral face is formed in an inner end, the inner peripheral face being to be in press contact with a forward-contracted tapered outer peripheral face of an annular protrusion which has the tapered outer peripheral face in a tip end, the tapered outer peripheral face being formed on an outer diameter side of a fluid path of the inner-pipe joint body, the inner-pipe sealing portion is formed to, by the inner-pipe sealing face configured by a forward-expanded outward taper face formed in a tip end portion of the inner-pipe receiving port, and a forward-expanded inward taper face in the press-insertion portion having a mountain-like section shape, pressingly hold the end portion of the inner pipe in an inclined state between the inner-pipe sealing face and the inward taper face, and the pipe joint further has a second inner-pipe sealing portion which is configured in a freely formable manner by pressing contact between the tapered inner peripheral face and the tapered outer peripheral face.

According to the invention, sealing is performed while the taper faces of the inner-pipe sleeve and the inner-pipe joint body are effectively pressingly contacted with each other by the pressing force toward the axis of the inner-pipe sleeve due to the fastening of the inner-pipe union nut. Moreover, there is a preferable effect of preventing a disadvantage that an inner end portion of the inner-pipe sleeve is deformed in the inner diameter direction by the pressing force, from occurring. As a result, in the inner joint portion, in addition to the inner-pipe sealing portion, the second sealing portion is formed over the projection portion of the inner-pipe sleeve and the inner-pipe joint body, and it is possible to provide a double-pipe joint which can connect and couple an inner pipe while preventing liquid leakage from occurring by two sealing portions in total.

In the invention, in the double-pipe joint of the second invention, the outer-pipe sleeve has: a press-insertion portion onto which the end portion of the outer pipe is to be pressingly inserted to increase a diameter of the end portion, thereby expanding the end portion so as to have a mountain-like section shape; an annular protrusion which is to be pressingly inserted into an annular groove formed in an outer diameter side of an inner-pipe passing path in the outer-pipe joint body; and a tapered outer peripheral face which is in press contact with a forward-expanded tapered inner peripheral face formed in a tip end portion of a cylindrical join end portion that is a portion between the annular groove and the inner-pipe passing path, the outer-pipe sealing portion is formed to, by the outer-pipe sealing face configured by a forward-expanded outward taper face formed in a tip end portion of the outer-pipe receiving port, and a forward-expanded inward taper face in the press-insertion portion having a mountain-like section shape, pressingly hold the end portion of the outer pipe in an inclined state between the outer-pipe sealing face and the inward taper face, and the pipe joint further has: a second outer-pipe sealing portion which is configured in a freely formable manner by fitting between the annular groove and the annular protrusion; and a third outer-pipe sealing portion which is configured in a freely formable manner by pressing contact between the tapered inner peripheral face and the tapered outer peripheral face.

According to the invention, the second sealing portion is formed by radially pressingly inserting the annular protrusion into the annular groove, and hence there is an advantage that an effective sealing effect is maintained even when the fastening force of the outer-pipe union nut is slightly lowered. In the third sealing portion, the tapered faces are caused to butt against each other by the pressure due to the press insertion of the annular protrusion into the annular groove, while preventing the join end portion of the outer-pipe joint body from inclinedly deforming toward the inner diameter side. Consequently, there is an advantage that the inclinedly deforming force can be effectively used as the pressingly contacting force between the taper faces, and the sealing property can be rationally enhanced. As a result, in the outer joint portion, the second and third sealing portions are formed over the projection portion of the outer-pipe sleeve and the outer-pipe joint body. Therefore, it is possible to provide a double-pipe joint which can stably connect and couple an outer pipe while preventing liquid leakage from occurring by three sealing portions in total.

In the invention, in the double-pipe joint of the second invention, the outer-pipe sleeve has: a press-insertion portion onto which the end portion of the outer pipe is to be pressingly inserted to increase a diameter of the end portion, thereby expanding the end portion so as to have a mountain-like section shape; and a projection portion in which a forward-expanded tapered inner peripheral face is formed in an inner end, the inner peripheral face being to be in press contact with a forward-contracted tapered outer peripheral face of an annular protrusion which has the tapered outer peripheral face in a tip end, the tapered outer peripheral face being formed on an outer diameter side of an inner-pipe passing path of the outer-pipe joint body, the outer-pipe sealing portion is formed to, by the outer-pipe sealing face configured by a forward-expanded outward taper face formed in a tip end portion of the outer-pipe receiving port, and a forward-expanded inward taper face in the press-insertion portion having a mountain-like section shape, pressingly hold the end portion of the outer pipe in an inclined state between the outer-pipe sealing face and the inward taper face, and the pipe joint further has a second outer-pipe sealing portion which is configured in a freely formable manner by pressing contact between the tapered inner peripheral face and the tapered outer peripheral face.

According to the invention, sealing is performed while the taper faces of the outer-pipe sleeve and the outer-pipe joint body are effectively pressingly contacted with each other by the pressing force toward the axis of the outer-pipe sleeve due to the fastening of the outer-pipe union nut. Moreover, there is a preferable effect of preventing a disadvantage that an inner end portion of the outer-pipe sleeve is deformed in the inner diameter direction by the pressing force, from occurring. As a result, in the outer joint portion, the second sealing portion is formed over the projection portion of the outer-pipe sleeve and the outer-pipe joint body, and it is possible to provide a double-pipe joint which can connect and couple an outer pipe while preventing liquid leakage from occurring by two sealing portions in total.

In the invention, in the double-pipe joint of the second invention, the outer-pipe sleeve has in an inner end a forward-contracted tapered outer peripheral face which butts against a forward-expended tapered inner peripheral face formed in a tip end portion of the outer-pipe joint body, and is formed into an annular member which is fittable onto the outer pipe, and the outer-pipe sealing portion is formed by reducing a diameter of the outer-pipe sleeve along the tapered inner peripheral face by fastening due to screw advancement of the outer-pipe union nut toward the outer-pipe receiving port, and pressingly contacting the tapered inner peripheral face and the outer peripheral face of the outer pipe via the outer-pipe sleeve.

According to the invention, the outer-pipe sleeve which is to be fitted onto the outer pipe is used. Therefore, a force in the diameter-increasing direction can be applied to the outer-pipe joint body, and a force in the diameter-reducing direction is applied to the outer pipe, whereby sealing of them and locking of the outer pipe can be realized. As in the case where an outer-pipe sleeve is used, therefore, the material of the outer pipe is not restricted to a synthetic resin material which expands and contracts in a relatively easy manner, and there is an advantage that outer pipes of various materials such as a metal pipe of high rigidity can be used. When a sleeve is used, it is necessary to determine the position of the end of the outer pipe in a relatively correct manner. By contrast, in the invention in which an outer-fitting sleeve is used, there is an advantage that, even when the relative positional relationship of the outer pipe and the outer-pipe joint body in the axial direction is somewhat deviated from a predetermined one, they can be connected and coupled to each other without causing any inconvenience.

In the invention, in the double-pipe joint of the second invention, the inner-pipe joint body for connecting and coupling double pipes with each other has:

the inner-pipe receiving ports which are formed in ends of the joint body, respectively;

a pair of the inner joint portions which use the inner-pipe receiving ports, respectively; and a pair of the outer joint portions.

According to the invention, the inner and outer joint portions are configured in the both ends of the inner-pipe joint body, respectively. Therefore, it is possible to provide a double-pipe joint which exerts any one of the above-mentioned effects of the second invention, as a joint which can suitably connect and coupe double pipes with each other.

DESCRIPTION OF THE PREFERRED EMBODIMENTS

[First Invention]

Figure 7:
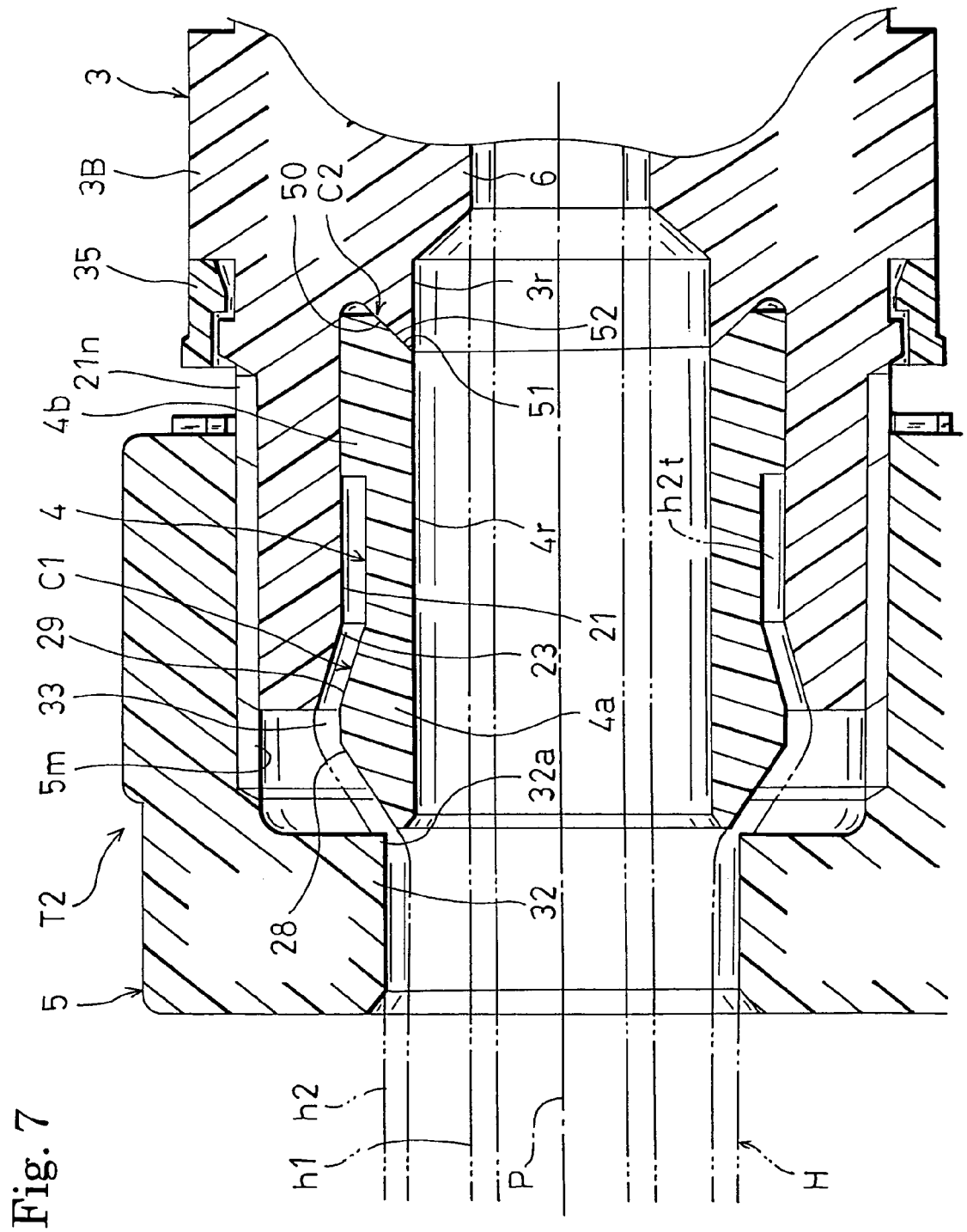
FIG. 7 is a section view showing a main portion of the structure of an outer-pipe joint portion in Embodiment 4.
Figure 8:
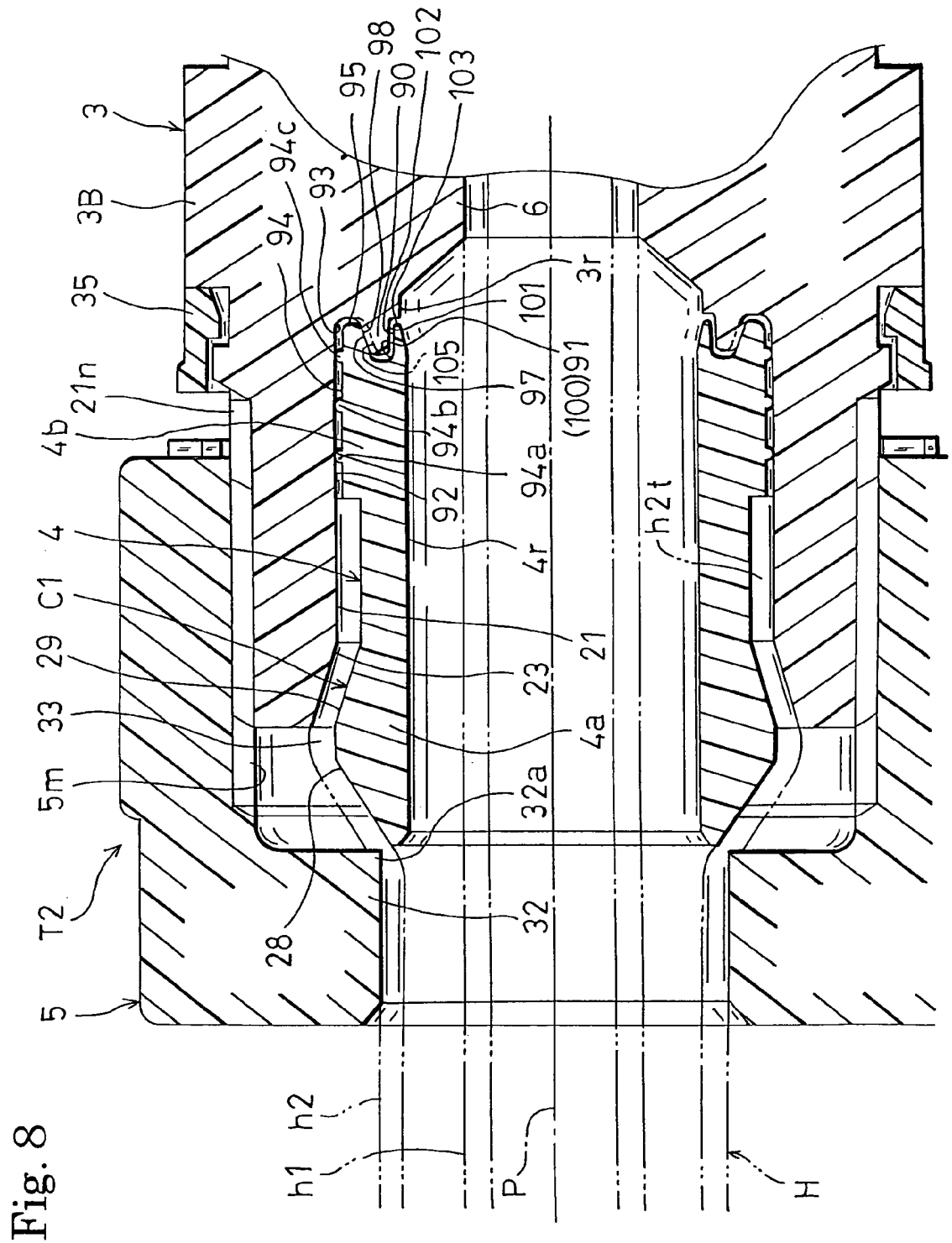
FIG. 8 is a section view showing a main portion of the structure of an outer-pipe joint portion in Embodiment 5.
Figure 9:
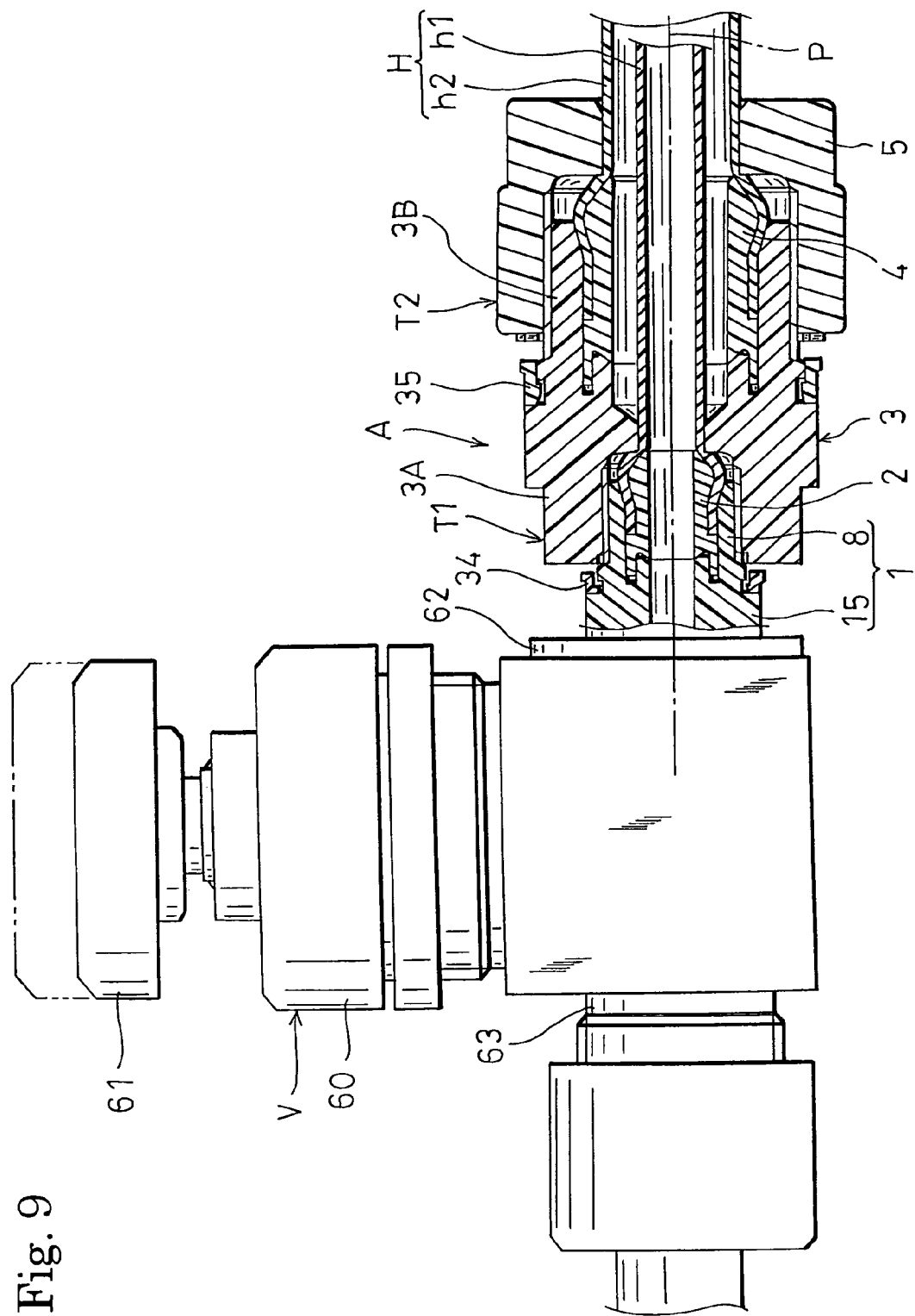
FIG. 9 is a side view of a double-pipe joint in Embodiment 6.

Hereinafter, embodiments of the double-pipe joint of the first invention will be described with reference to the accompanying drawings. FIGS. 1 to 4 show a plan view of the whole double-pipe joint of Embodiment 1 which is used for connecting and coupling double pipes, a side section view, a section view of an inner joint portion, and a section view of an outer joint portion, and FIGS. 5 to 8 show main portions of double-pipe joints of Embodiment 2 to 5, respectively. FIG. 9 is a side view showing the whole double-pipe joint of Embodiment 6 which is used for connecting and coupling a valve and a double pipe.

Embodiment 1

Figure 1:
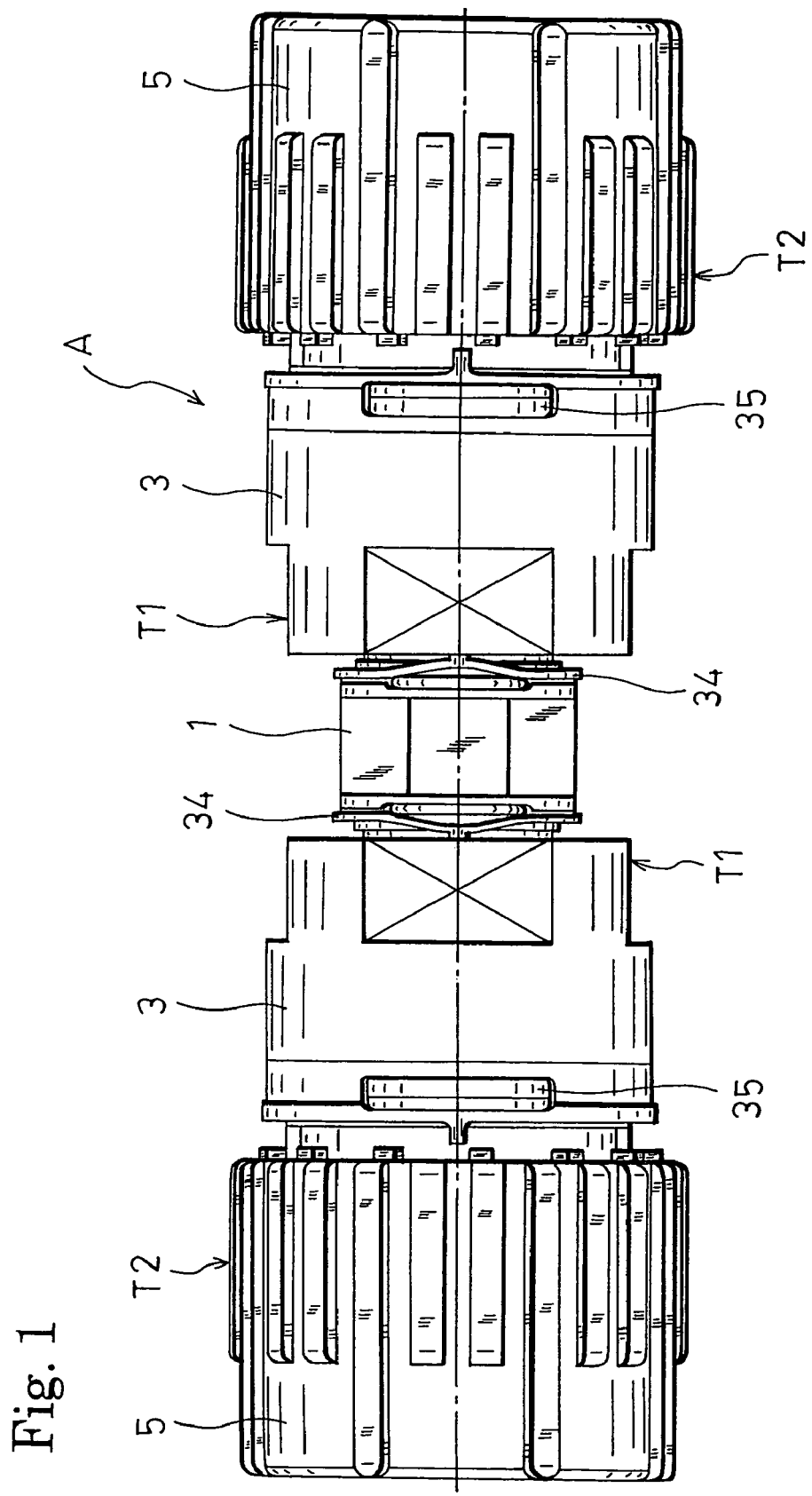
FIG. 1 is a plan view of a double-pipe joint in Embodiment 1.
Figure 2:
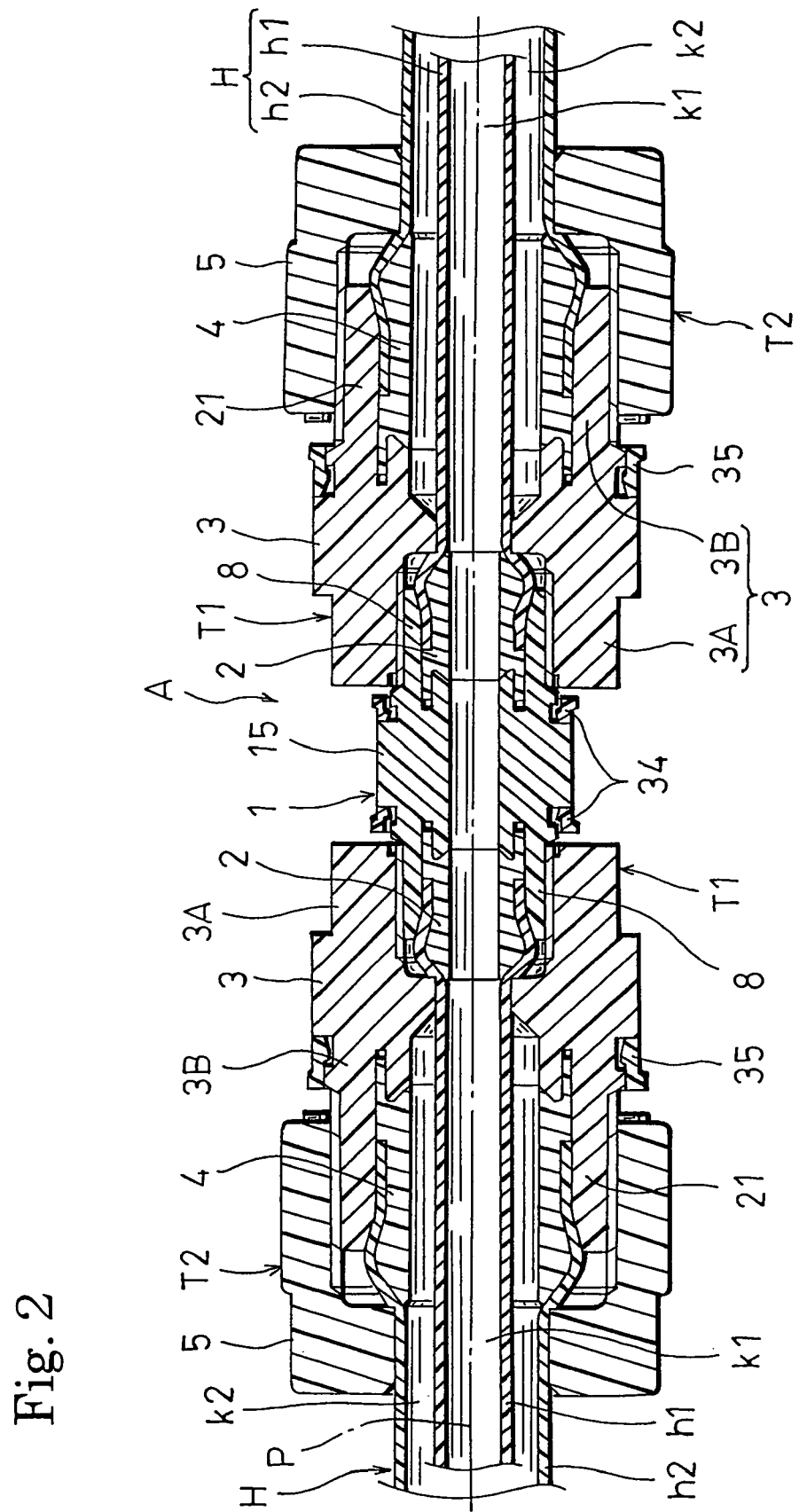
FIG. 2 is a section view of the double-pipe joint of FIG. 1.

As shown FIGS. 1 and 2, the double-pipe joint A of Embodiment 1 is used for connecting and coupling double pipes H, H which are opposed to each other, and configured by nine components in total, or one inner-pipe joint body 1, a pair of inner-pipe sleeves 2, 2, a pair of nut-equipped bodies 3, 3, a pair of outer-pipe sleeves 4, 4, and a pair of union nuts (outer-pipe union nuts) 5, 5. The inner-pipe joint body 1, the inner-pipe sleeves 2, and the nut-equipped bodies 3 constitute a pair of inner-pipe inner joint portions T1, and the nut-equipped bodies 3, the outer-pipe sleeves 4, and the union nuts 5 constitute a pair of outer-pipe outer joint portions T2. The double-pipe joint A is bilaterally symmetric. Each of the nut-equipped bodies 3 is formed as a component which combines an inner-pipe union nut portion (inner-pipe union nut) 3A and an outer-pipe joint body portion (an example of an outer-pipe joint body) 3B.

As shown in FIG. 2, the double pipe H to be used in the double-pipe joint A is configured by an inner pipe h1, and an outer pipe h2 which surrounds the inner pipe. The pipes h1, h2 are formed by tube members made of fluororesin such as PTFE or PFA. A first space k1 which is the interior of the inner pipe h1 is a transporting path for a fluid. A second space k2 which is a space between the inner pipe h1 and the outer pipe h2 functions as a buffering space for leakage prevention which prevents a fluid leaking from the inner pipe h1 caused by any reason from leaking to the outside. Next, the structure of the double-pipe joint A will be described in detail with respect to the inner and outer joint portions T1, T2 on one side.

Figure 3:
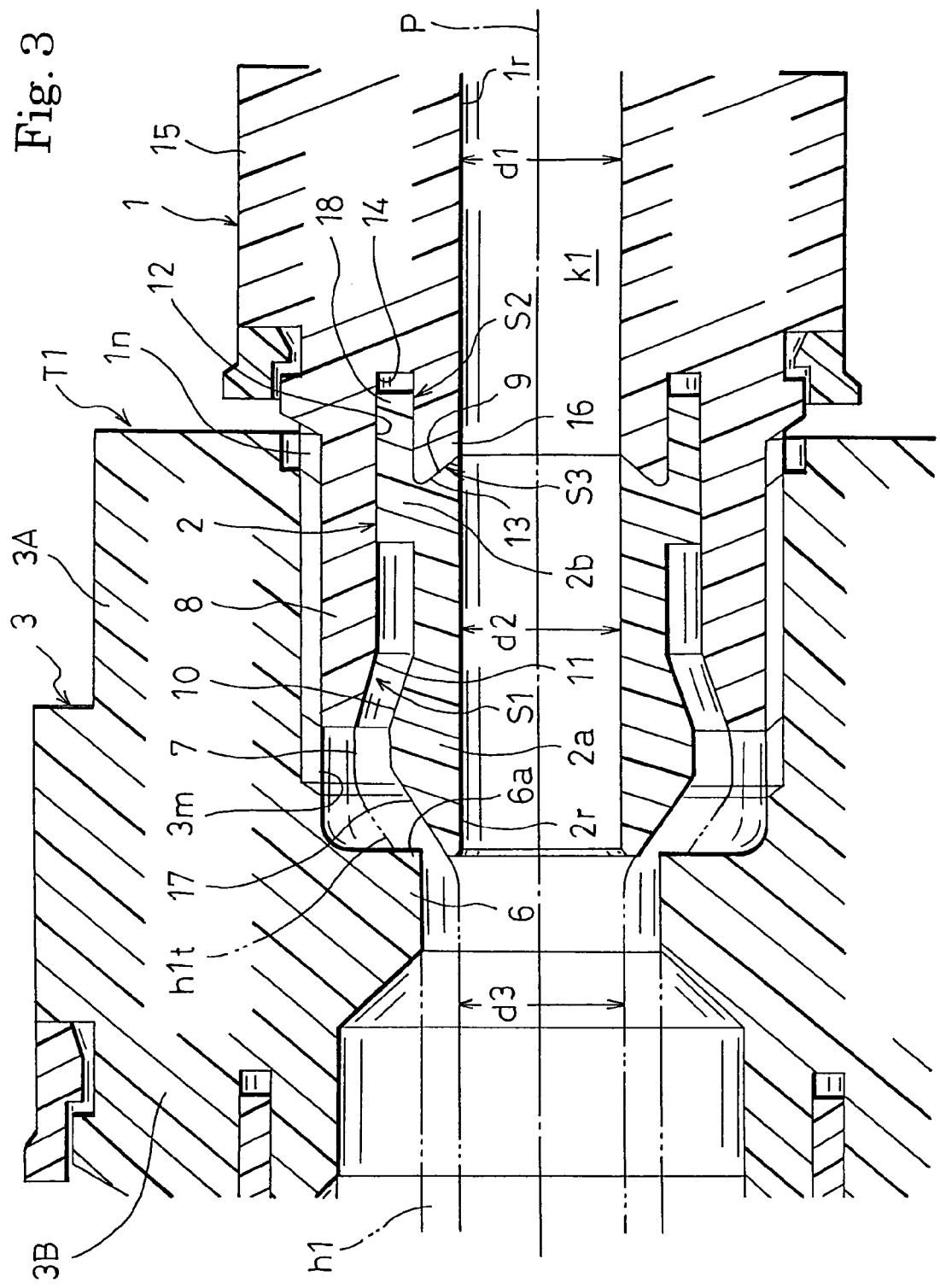
FIG. 3 is an enlarged section view showing a main portion of the structure of an inner-pipe joint portion in FIG. 1.

As shown in FIGS. 1 to 3, the inner-pipe joint body 1 is formed as a cylindrical member made of fluororesin such as PFA having: a barrel wall portion 15; cylindrical receiving ports 8 which are opened in the ends of the barrel wall portion 15; and annular protrusions (an example of the join end portions) 16 which are separately formed on the inner diameter sides of the receiving ports 8. First to third sealing faces 11 to 13 are disposed inside each of the receiving ports 8 of the inner-pipe joint body 1. The first sealing face 11 is formed in the inlet of the receiving port 8 by a tapered face which is gradually made larger in diameter as further moving in a direction crossing the axis P, i.e., toward the outer side with respect to the direction of the axis P. The third sealing face 13 is formed inner than the inlet of the receiving port 8 of the inner-pipe joint body 1 by a tapered face which is gradually made larger in diameter as further moving in a direction crossing the axis P of the inner-pipe joint body 1, i.e., toward the outer side with respect to the direction of the axis P. The second sealing face 12 is configured by an annular groove 14 which is formed in an inner portion of the receiving port 8 of the inner-pipe joint body 1, further outward in a radial direction than the third sealing face 13, in parallel to the axis P. An external thread 1n is formed in the outer periphery of the receiving port 8 of the inner-pipe joint body 1. The reference numeral 34 denotes gauge rings which are fitted to the ends of the barrel wall portion 15 in order to restrict excess fastening of the nut-equipped bodies 3.

By contrast, the inner-pipe sleeve (inner ring) 2 made of a synthetic resin (for example, fluororesin such as PFA) is pressingly inserted into an end portion of the inner pipe h1. As shown in FIGS. 2 and 3, the inner-pipe sleeve 2 is formed into a sleeve-like shape (cylindrical shape) having: a press-insertion portion 2a which has an abacus bead-like section shape, and which is to be pressingly inserted into the end portion of the inner pipe h1 to increase the diameter of the end portion, thereby expanding the end portion so as to have a mountain-like section shape; a projection portion 2b which is continuous to the press-insertion portion 2a, and which is projected from the end portion of the inner pipe h1 toward the inner side; and a fluid transporting path 2r which bridges the portions. In the press-insertion portion 2a having a mountain-like section shape, an outward tapered face 17 is formed on one inclined face of the portion, and an inward tapered face 10 which cooperates with the first sealing face 11 to pressingly hold the end portion of the inner pipe h1 in an inclined state to form a first sealing portion (an example of the inner-pipe sealing portion) S1 is formed on the other inclined face.

The projection portion 2b has: a projection end face 9 formed by a tapered face which butts against the third sealing face 13 to be in close contact therewith to form a third sealing portion S3; and a cylindrical portion (an example of the annular protrusion) 18 which is to be pressingly inserted into the annular groove 14 that is the second sealing face 12, to form a second sealing portion S2. The diameter d2 of the fluid transporting path 2r of the inner-pipe sleeve 2 is set to be equal to or substantially equal to the inner diameter d3 of the inner pipe h1, thereby allowing the fluid to smoothly flow without stagnating. For the same purpose, the diameter d2 of the fluid transporting path 2r of the inner-pipe sleeve 2 is set also to be equal to the diameter d1 of a fluid path 1r of the inner-pipe joint body 1.

In the union nut portion 3A constituting the inner joint portion T1 for connecting and coupling the inner pipe h1 in the nut-equipped body 3 made of fluororesin such as PTFE, as shown in FIGS. 1 to 3, an internal thread 3m which is to be screwed with the external thread in of the inner-pipe joint body 1 is formed in the internal periphery, an annular flange 6 is inwardly projected from one end portion, and a pressing edge 6a having an acute or right angle is formed in an axially inner end of the inner peripheral face of the annular flange 6. The end portion of the inner pipe h1 into which the inner-pipe sleeve 2 is pressingly inserted is inserted into the receiving port 8 of the inner-pipe joint body 1, and the internal thread 3m of the nut-equipped body 3 which is previously loosely fitted to the outer periphery of the end portion of the inner pipe h1 is screwed with the external thread In of the inner-pipe joint body 1 to be fastened.

In accordance with this fastening, the pressing edge 6a of the nut-equipped body 3 butts against an expansion basal portion of a large-diameter portion 7 of the inner pipe h1 to axially press the inner-pipe sleeve 2. As a result, as shown in FIG. 3, the inner-pipe end portion hit is pressingly held in an inclined state between the inward tapered face 10 of the inner-pipe sleeve 2 and the first sealing face 11 of the inner-pipe joint body 1, thereby forming a first sealing portion S1, and the cylindrical portion 18 of the inner-pipe sleeve 2 is pressingly inserted into the annular groove 14 which is the second sealing face 12, to form the second sealing portion S2. Furthermore, the projection end face 9 of the inner-pipe sleeve 2 is pressed against the first sealing face 11 of the inner-pipe joint body 1 to form the third sealing portion S3. In this case, the annular groove 14 is set to be sufficiently deeper as compared with the projection length of the cylindrical portion 18, so that the projection end face 9 and the third sealing face 13 are surely pressingly contacted with each other. The first to third sealing portions S1 to S3 exert a sealing function of high reliability in the inner joint portion T1.

Figure 4:
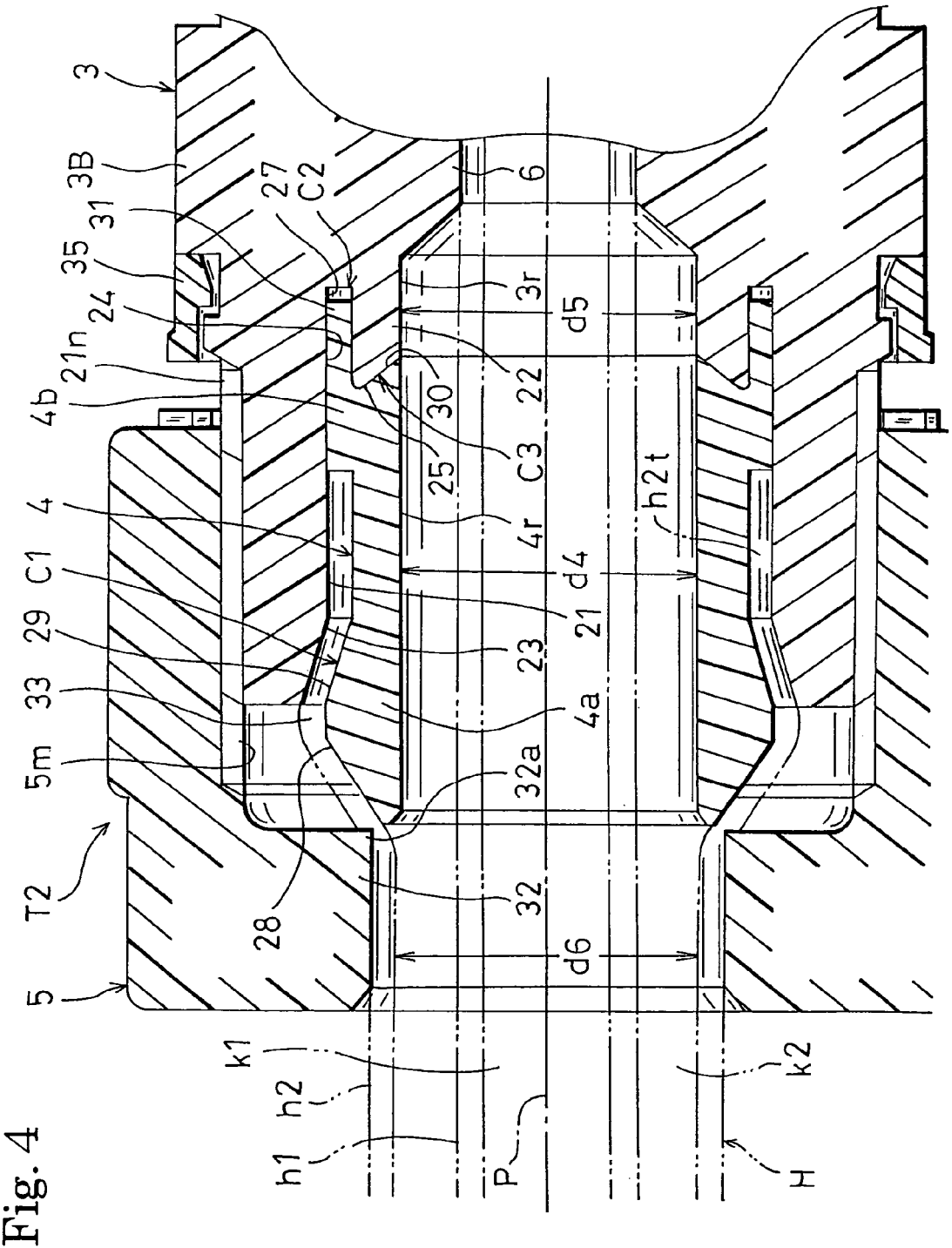
FIG. 4 is an enlarged section view showing a main portion of the structure of an outer-pipe joint portion in FIG. 1.

As shown in FIGS. 1, 2, and 4, the joint body portion 3B constituting the outer joint portion T2 for connecting and coupling the outer pipe h2 in the nut-equipped body 3 is formed into a cylindrical portion having: a receiving port 21 which has an external thread 21n in the outer periphery; and an annular protrusion (an example of the join end portions) 22 which is separately formed on the inner diameter side of the receiving port. The reference numeral 35 denotes a gauge ring which is fitted to the joint body portion 3B in order to restrict excess fastening of the union nut 5. First to third sealing faces 23 to 25 are disposed inside the receiving port 21 of the joint body portion 3B. The first sealing face 23 is formed in the inlet of the receiving port 21 by a tapered face which is gradually made larger in diameter as further moving in a direction crossing the axis P, i.e., toward an outer side with respect to the direction of the axis P. The third sealing face 25 is formed inner than the inlet of the receiving port 21 of the joint body portion 3B by a tapered face which is gradually made larger in diameter as further moving in a direction crossing the axis P of the joint body portion 3B, i.e., toward an outer side with respect to the direction of the axis P. The second sealing face 24 is configured by an annular groove 27 which is formed in an inner portion of the receiving port 21 of the joint body portion 3B, further outward in a radial direction than the third sealing face 25, in parallel to the axis P.

The outer-pipe sleeve (outer-pipe inner ring) 4 made of a synthetic resin such as fluororesin is pressingly inserted into an end portion of the outer pipe h2. As shown in FIGS. 2 and 4, the outer-pipe sleeve 4 is formed into a sleeve-like shape (cylindrical shape) having: a press-insertion portion 4a which has an abacus bead-like section shape, and which is to be pressingly inserted into the end portion of the outer pipe h2 to increase the diameter of the end portion, thereby expanding the end portion so as to have a mountain-like section shape; a projection portion 4b which is continuous to the press-insertion portion 4a, and which is projected from the end portion of the outer pipe h2 toward the inner side; and a fluid transporting path 4r which bridges the portions. In the press-insertion portion 4a having a mountain-like section shape, an outward tapered face 28 is formed on one inclined face of the portion, and an inward tapered face 29 which cooperates with the first sealing face 23 to pressingly hold the end portion of the outer pipe h2 in an inclined state to form a first sealing portion (an example of the outer-pipe sealing portion) C1 is formed on the other inclined face.

The projection portion 4b has: a projection end face 30 formed by a tapered face which butts against the third sealing face 25 to be in close contact therewith to form a third sealing portion C3; and a cylindrical portion 31 which is to be pressingly inserted into the annular groove 27 which is the second sealing face 24, to form a second sealing portion C2. The diameter d4 of the fluid transporting path 4r of the outer-pipe sleeve 4 is set to be equal to or substantially equal to the inner diameter d6 of the outer pipe h2, thereby allowing the fluid to smoothly flow without stagnating. For the same purpose, the diameter d4 of the fluid transporting path 4r of the outer-pipe sleeve 4 is set also to be equal to the diameter d5 of an inner-pipe passing path 3r of the outer-pipe joint body portion 3B.

In the union nut 5 made of fluororesin such as PFA, as shown in FIGS. 1, 2, and 4, an internal thread 5m which is to be screwed with the external thread 21n of the joint body portion 3B is formed, an annular flange 32 is inwardly projected from one end portion, and a pressing edge 32a having an acute or right angle is formed in an axially inner end of the inner peripheral face of the annular flange 32. The end portion of the outer pipe h2 into which the outer-pipe sleeve 4 is pressingly inserted is inserted into the receiving port 21 of the joint body portion 3B, and the internal thread 5m of the union nut 5 which is previously loosely fitted to the outer periphery of the end portion of the outer pipe h2 is screwed with the external thread 21n of the joint body portion 3B to be fastened.

In accordance with this fastening, the pressing edge 32a of the union nut 5 butts against an expansion basal portion of a large-diameter portion 33 of the outer pipe h2 to axially press the outer-pipe sleeve 4. As a result, as shown in FIG. 4, the end portion of the outer pipe h2 is pressingly held in an inclined state between the inward tapered face 29 of the outer-pipe sleeve 4 and the second sealing face 24 of the joint body portion 3B, thereby forming the first sealing portion C1, and the cylindrical portion 31 which is the second sealing face 24 of the outer-pipe sleeve 4 is pressingly inserted into the annular groove 27 to form the second sealing portion C2. Furthermore, the projection end face 30 of the outer-pipe sleeve 4 is pressed against the third sealing face 25 of the joint body portion 3B to form the third sealing portion C3. In this case, the annular groove 27 is set to be sufficiently deeper as compared with the projection length of the cylindrical portion 31, so that the projection end face 30 and the third sealing face 25 are surely pressingly contacted with each other. The first to third sealing portions C1 to C3 exert a sealing function of high reliability in the outer joint portion T2.

The inner-pipe and outer-pipe sleeves used in the double-pipe joint A of Embodiment 1 are similar to each other. The inner-pipe sleeve 2 has: the press-insertion portion 2a onto which the inner-pipe end portion hit that is increased in diameter and expanded into a mountain-like section shape is to be pressingly fitted; the annular protrusion 18 which is to be pressingly inserted into the annular groove 14 that is formed on the outer diameter side of the fluid path 1r of the inner-pipe joint body 1; and the tapered outer peripheral face 9 which is pressingly contacted with the forward-expanded tapered inner peripheral face 13 formed in the tip end portion of the cylindrical join end portion 16 that is a portion between the annular groove 14 and the fluid path 1r. The inner-pipe sealing face 11 which is configured by the forward-expanded outward tapered face formed in the tip end portion of the inner-pipe receiving port 8, and the forward-expanded inward tapered face 10 in the press-insertion portion 2a having a mountain-like section shape form the first inner-pipe sealing portion S1 which pressingly holds the inner-pipe end portion hit in an inclined state between the inner-pipe sealing face 11 and the inward tapered face 10. The second inner-pipe sealing portion S2 formed by fitting between the annular groove 14 and the annular protrusion 18, and the third inner-pipe sealing portion S3 formed by pressing contact between the tapered inner peripheral face 13 and the tapered outer peripheral face 9 are configured in a freely formable manner.

The outer-pipe sleeve 4 has: the press-insertion portion 4a onto which an outer-pipe end portion h2t that is increased in diameter and expanded into a mountain-like section shape is to be pressingly fitted; the annular protrusion 31 which is to be pressingly inserted into the annular groove 27 that is formed on the outer diameter side of the inner-pipe passing path 3r of the outer-pipe joint body 3B; and the tapered outer peripheral face 30 which is pressingly contacted with the forward-expanded tapered inner peripheral face 25 formed in the tip end portion of the cylindrical join end portion 22 that is a portion between the annular groove 27 and the inner-pipe passing path 3r. The outer-pipe sealing face 23 which is configured by the forward-expanded outward tapered face formed in the tip end portion of the outer-pipe receiving port 21, and the forward-expanded inward tapered face 29 in the press-insertion portion 4a having a mountain-like section shape form the outer-pipe sealing portion C1 which pressingly holds the outer-pipe end portion h2t in an inclined state between the outer-pipe sealing face 23 and the inward tapered face 29. The second outer-pipe sealing portion C2 formed by fitting between the annular groove 27 and the annular protrusion 31, and the third outer-pipe sealing portion C3 formed by pressing contact between the tapered inner peripheral face 25 and the tapered outer peripheral face 30 are configured in a freely formable manner.

In the double-pipe joint A of Embodiment 1, the union nut portion 3A which is a component of the inner joint portion T1, and the joint body portion 3B which is a component of the outer joint portion T2 are formed into the nut-equipped body 3 which is a single part. As a result, the inner joint portion T1 and the outer joint portion T2 are organically integrated with each other, and the double-pipe joint A has also a function of coaxially holding the positions of the inner pipe h1 and the outer pipe h2 which are connected and coupled to the joint.

Embodiment 2

Figure 5:
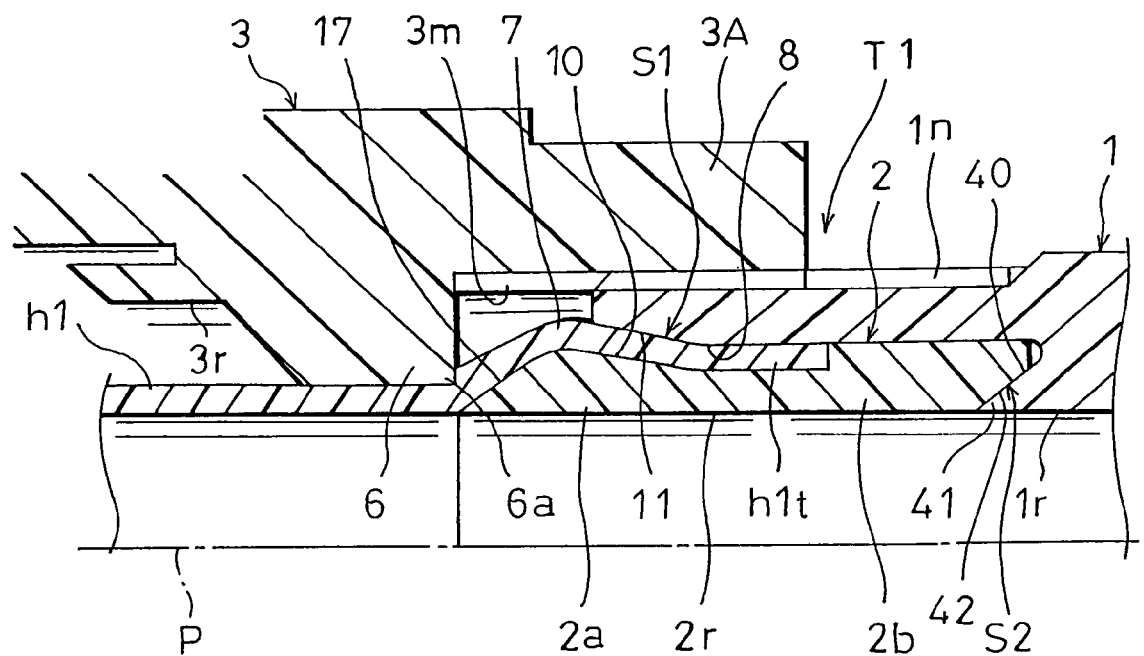
FIG. 5 is a section view showing a main portion of the structure of an inner-pipe joint portion in Embodiment 2.

In the double-pipe joint A of Embodiment 2, the inner joint portion T1 of the double-pipe joint A of Embodiment 1 is configured in a different manner. In the inner joint portion T1 of a first other structure, namely, as shown in FIG. 5, the inner-pipe sleeve 2 has: the press-insertion portion 2a onto which the inner-pipe end portion hit that is increased in diameter and expanded into a mountain-like section shape is to be pressingly fitted; and the projection portion 2b in which a forward-expended tapered inner peripheral face 42 that is to be pressingly contacted with a forward-contracted tapered outer peripheral face 40 of an annular protrusion 41 is formed in the innermost end. The annular protrusion has the tapered outer peripheral face 40 which is formed on the outer diameter side of the fluid path 1r of the inner-pipe joint body 1.

The inner-pipe sealing face 11 which is configured by the forward-expanded outward tapered face formed in the tip end portion of the inner-pipe receiving port 8, and the forward-expanded inward tapered face 10 in the press-insertion portion 2a having a mountain-like section shape form the inner-pipe sealing portion S1 which pressingly holds the inner-pipe end portion h1t in an inclined state between the inner-pipe sealing face 11 and the inward tapered face 10. Furthermore, the second inner-pipe sealing portion S2 formed by pressing contact between the tapered outer peripheral face 40 and the tapered inner peripheral face 42 is configured in a freely formable manner.

Namely, the inner joint portion T1 in Embodiment 2 is identical with that in Embodiment 1 shown in FIG. 3, other than the fitting structure between the inner portion of the inner-pipe sleeve 2 and the inner-pipe joint body 1. In this case, the inner tip end of the projection portion 2b has a cut-away shape, so that the tapered outer peripheral face 40 and the tapered inner peripheral face 42 are surely in press contact with each other to form the effective second inner-pipe sealing portion S2.

Embodiment 3

Figure 6:
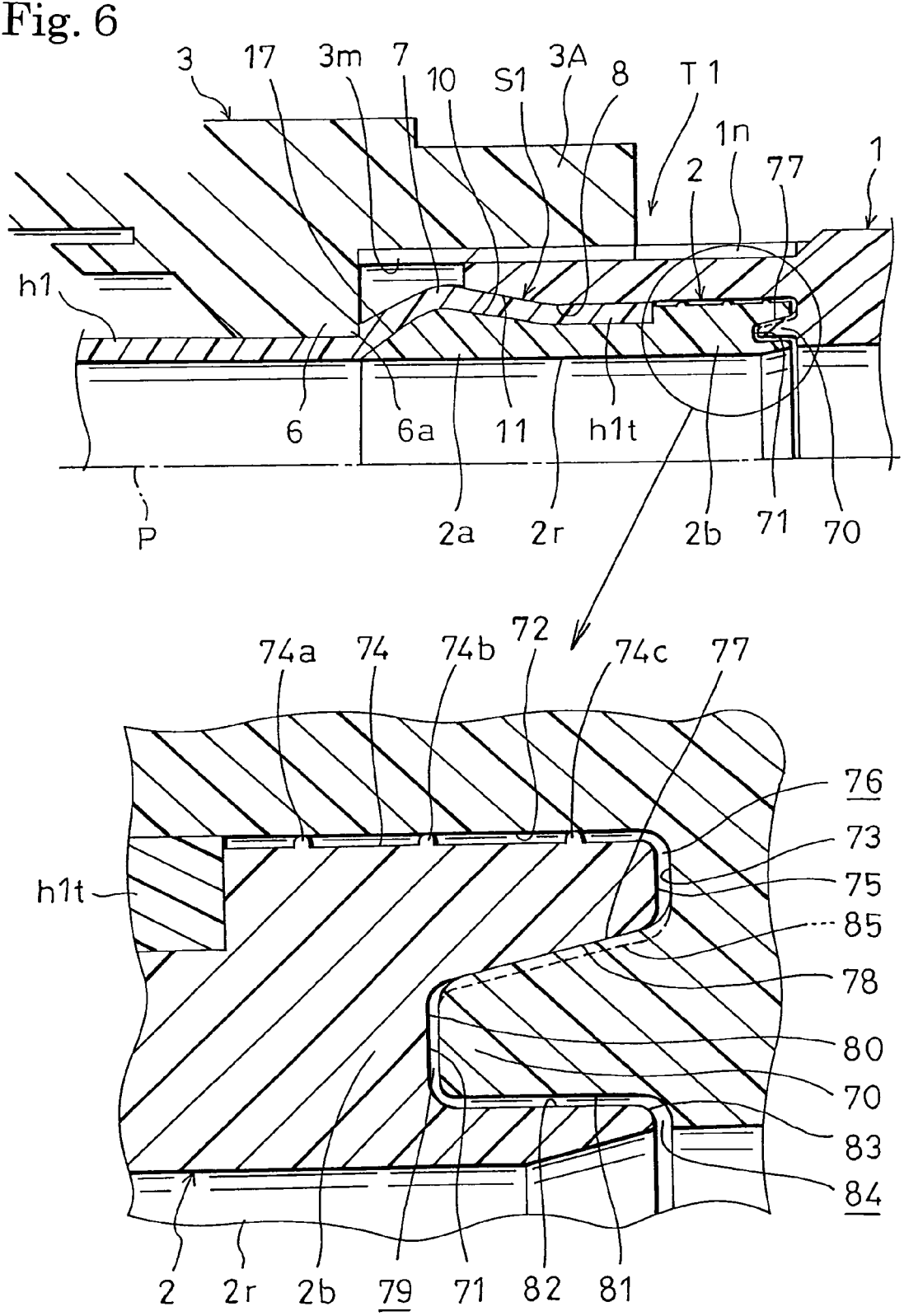
FIG. 6 is a section view showing a main portion of the structure of an inner-pipe joint portion in Embodiment 3.

In the double-pipe joint A of Embodiment 3, the inner joint portion T1 of the double-pipe joint A of Embodiment 1 or 2 is configured in a different manner. As shown in FIG. 6, the inner joint portion T1 of a second other structure is different from the inner joint portion T1 of Embodiment 1 only in the fitting structure between the projection portion 2b of the inner-pipe sleeve 2 and the inner-pipe joint body 1, and identical therewith in the other configuration. In the projection portion 2b of the inner-pipe sleeve 2, namely, an annular recess 71 is formed for housing an annular convex 70 which is formed on the inner-pipe joint body 1, and which is projected in the direction of the axis P.

As shown in FIG. 6, three first protrusions 74a to 74c which are separated from one another by predetermined intervals are annularly formed on a first face 74 which is an outer peripheral face of the projection portion 2b. The first protrusions 74a to 74c have, for example, a trapezoidal section shape, and are formed so that the outer peripheries are in press contact with a cylindrical face 72 of the inner-pipe joint body 1. In this case, the first face 74 of the projection portion 2b is formed substantially in parallel to the cylindrical face 72 which is formed in parallel to the axis P. A second face 75 which is in a noncontact state with an inner flat face 73 of the inner-pipe joint body 1 is formed on the projection portion 2b. A first gap 76 is formed between the second face 75 of the projection portion 2b and the inner flat face 73 of the inner-pipe joint body 1.

The annular recess 71 of the projection portion 2b is configured by: a third face 78 which is inclined by a predetermined angle with respect to the second face 75, and which butts against an inclined face 77 of the annular convex 70 of the inner-pipe joint body 1; a fourth face 80 which extends from the third face 78, and which forms a second gap 79 with respect to the top of the annular convex 70; a fifth face 82 which is formed in a noncontact state with a wall face 81 of the annular convex 70, and in parallel to the axis P; and a sixth face 83 which is continuous to the fifth face 82, and which forms a peripheral edge portion. A third gap 84 is formed by the sixth face 83 of the projection portion 2b and a hem portion of the annular convex 70. A plurality of grooves 85 which elongate along the direction of the axis P, and through which the first gap 76 and the second gap 79 communicate with each other are formed in the inclined face 77 of the annular convex 70 disposed on the inner-pipe joint body 1. The grooves 85 are formed so as to be separated by predetermined angles, and radially elongate.

Embodiment 4

In the double-pipe joint A of Embodiment 4, the outer joint portion T2 of the double-pipe joint A of Embodiments 1 to 3 is configured in a different manner. In the outer joint portion T2 of the first other structure, namely, as shown in FIG. 7, the outer-pipe sleeve 4 has: the press-insertion portion 4a onto which the outer-pipe end portion h2t that is increased in diameter and expanded into a mountain-like section shape is to be pressingly fitted; and the projection portion 4b in which a forward-expended tapered inner peripheral face 52 that is to be pressingly contacted with a tapered outer peripheral face 50 of an annular protrusion 51, the peripheral face having a forward-contracted tip end, is formed in the innermost end. The annular protrusion has the tapered outer peripheral face 50 which is formed on the outer diameter side of the inner-pipe passing path 3r of the outer-pipe joint body 3B.

The outer-pipe sealing face 23 which is configured by the forward-expanded outward tapered face formed in the tip end portion of the outer-pipe receiving port 21, and the forward-expanded inward tapered face 29 in the press-insertion portion 4a having a mountain-like section shape form the outer-pipe sealing portion C1 which pressingly holds the outer-pipe end portion h2t in an inclined state between the outer-pipe sealing face 23 and the inward tapered face 29. Furthermore, the second outer-pipe sealing portion C2 formed by pressing contact between the tapered outer peripheral face 50 and the tapered inner peripheral face 52 is configured in a freely formable manner.

Namely, the outer joint portion T2 in Embodiment 4 is identical with that in Embodiment 1 shown in FIG. 4, other than the fitting structure between the inner portion of the outer-pipe sleeve 4 and the outer-pipe joint body portion 3B. In this case, the inner tip end of the projection portion 4b has a cut-away shape, so that the tapered outer peripheral face 50 and the tapered inner peripheral face 52 are surely in press contact with each other to form the effective second outer-pipe sealing portion C2.

Embodiment 5

In the double-pipe joint A of Embodiment 5, the outer joint portion T2 of the double-pipe joint A of Embodiments 1 to 3 is configured in a different manner. As shown in FIG. 8, the outer joint portion T2 of the second other structure is different from that of Embodiment 1 only in the fitting structure between the projection portion 4b of the outer-pipe sleeve 4 and the outer-pipe joint body portion 3B, and identical therewith in the other configuration. In the projection portion 4b of the outer-pipe sleeve 4, namely, an annular recess 91 is formed for housing an annular convex 90 which is formed on the outer-pipe joint body portion 3B, and which is projected in the direction of the axis P. The outer joint portion T2 has the same structure as that shown in an enlarged view of the portion which is circled in FIG. 6. The description of Embodiment 3 is applied also to the embodiment. For reference, however, the reference numerals used in FIG. 6 are indicated in parentheses. The enlarged view is identical with FIG. 6, and, for reference, components which cannot be denoted by reference numerals in FIG. 8 are indicated in the description by the reference numerals of FIG. 6 in parentheses.

As shown in FIG. 8, three first protrusions 94a to 94c which are separated from one another by predetermined intervals are annularly formed on a first face 94 which is an outer peripheral face of the projection portion 4b. The first protrusions 94a to 94c have, for example, a trapezoidal section shape, and are formed so that the outer peripheries are in press contact with a cylindrical face 92 of the outer-pipe joint body portion 3B. In this case, the first face 94 of the projection portion 4b is formed substantially in parallel to the cylindrical face 92 which is formed in parallel to the axis P. A second face 95 which is in a noncontact state with an inner flat face 93 of the outer-pipe joint body portion 3B is formed on the projection portion 4b. A first gap (76) is formed between the second face 95 of the projection portion 4b and the inner flat face 93 of the outer-pipe joint body portion 3B.

The annular recess 91 of the projection portion 4b is configured by: a third face 98 which is inclined by a predetermined angle with respect to the second face 95, and which butts against an inclined face 97 of the annular convex 90 of the outer-pipe attaching portion 3B; a fourth face 100 which extends from the third face 98, and which forms a second gap (79) with respect to the top of the annular convex 90; a fifth face 102 which is formed in a noncontact state with a wall face 101 of the annular convex 90, and in parallel to the axis P; and a sixth face 103 which is continuous to the fifth face 102, and which forms a peripheral edge portion. A third gap (84) is formed between the sixth face 103 of the projection portion 4b and a hem portion of the annular convex 90. A plurality of grooves 105 which elongate along the direction of the axis P, and through which the first gap (76) and the second gap (79) communicate with each other are formed in the inclined face 97 of the annular convex 90 disposed in the outer-pipe joint body 3B. The grooves 105 are formed so as to be separated by predetermined angles, and radially elongate.

Embodiment 6

The double-pipe joint A of Embodiment 6 is used for connecting and coupling a valve V and a double pipe H, and has a configuration corresponding to one side portion of the double-pipe joint A of Embodiment 1. As shown in FIG. 9, the valve (manual stop valve) V has a valve body 60, a rotation operating portion 61, a pair of fluid supplying/discharging portions 62, 63, etc. For example, the double-pipe joint A is configured so that the double pipe H is freely connectable and couplable to the supplying portion 62 which is a fluid inlet of the valve body 60. The double-pipe joint has: the inner joint portion T1 having an inner-pipe joint body 1 which is formed integrally with the supplying portion 62; and the outer joint portion T2.

The inner-pipe joint body 1 having a shape which is obtained by splitting the inner-pipe joint body 1 of the double-pipe joint A of Embodiment 1 shown in FIGS. 1 and 2, along a middle portion in the direction of the axis P is formed in the supplying portion 62. The other configuration is identical with the one side of the double-pipe joint A of Embodiment 1. Therefore, reference numerals corresponding to those of the double-pipe joint A of Embodiment 1 are used in FIG. 7, and the further detailed description of the structure is omitted.

[Combination Structure of Double-Pipe Joint]

In Embodiments 1 to 5, each of the inner joint portion T1 and the outer joint portion T2 constituting the double-pipe joint A is contemplated to have at least three kinds of structures (1: the structure of FIGS. 3 and 4, 2: the structure of FIGS. 5 and 7, and 3: the structure of FIGS. 6 and 8). Therefore, the structure of the double-pipe joint A can be formed in 3×3=9 or more combinations. In the case of the joint for double pipes shown in Embodiment 1, there are one pair of inner joint portions T1, and one pair of outer joint portion T2. More correctly, therefore, 9×9=81 or more combinations are possible. Also in the double-pipe joint A of Embodiment 6, each of the inner joint portion T1 and the outer joint portion T2 is contemplated to have the above-mentioned three kinds of structures. Of course, therefore, at least nine combinations of structures can be obtained. The inner pipe h1 and the outer pipe h2 may have various inner diameters. As shown in FIG. 2 and the like, the inner pipe h1 and the outer pipe h2 which are paired may have different inner diameters.

[Second Invention]

Figure 10:
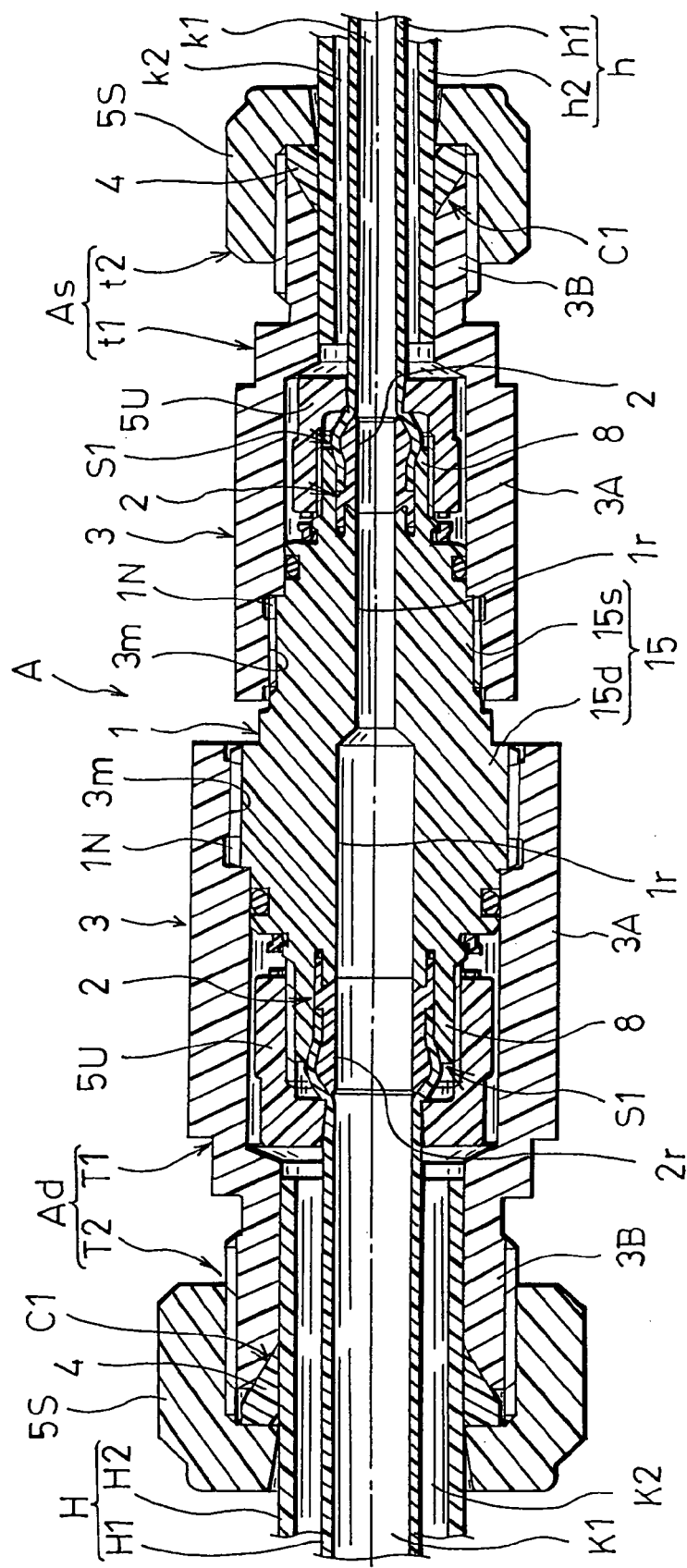
FIG. 10 is a section view showing the structure of a double-pipe joint in Embodiment 7.
Figure 11:
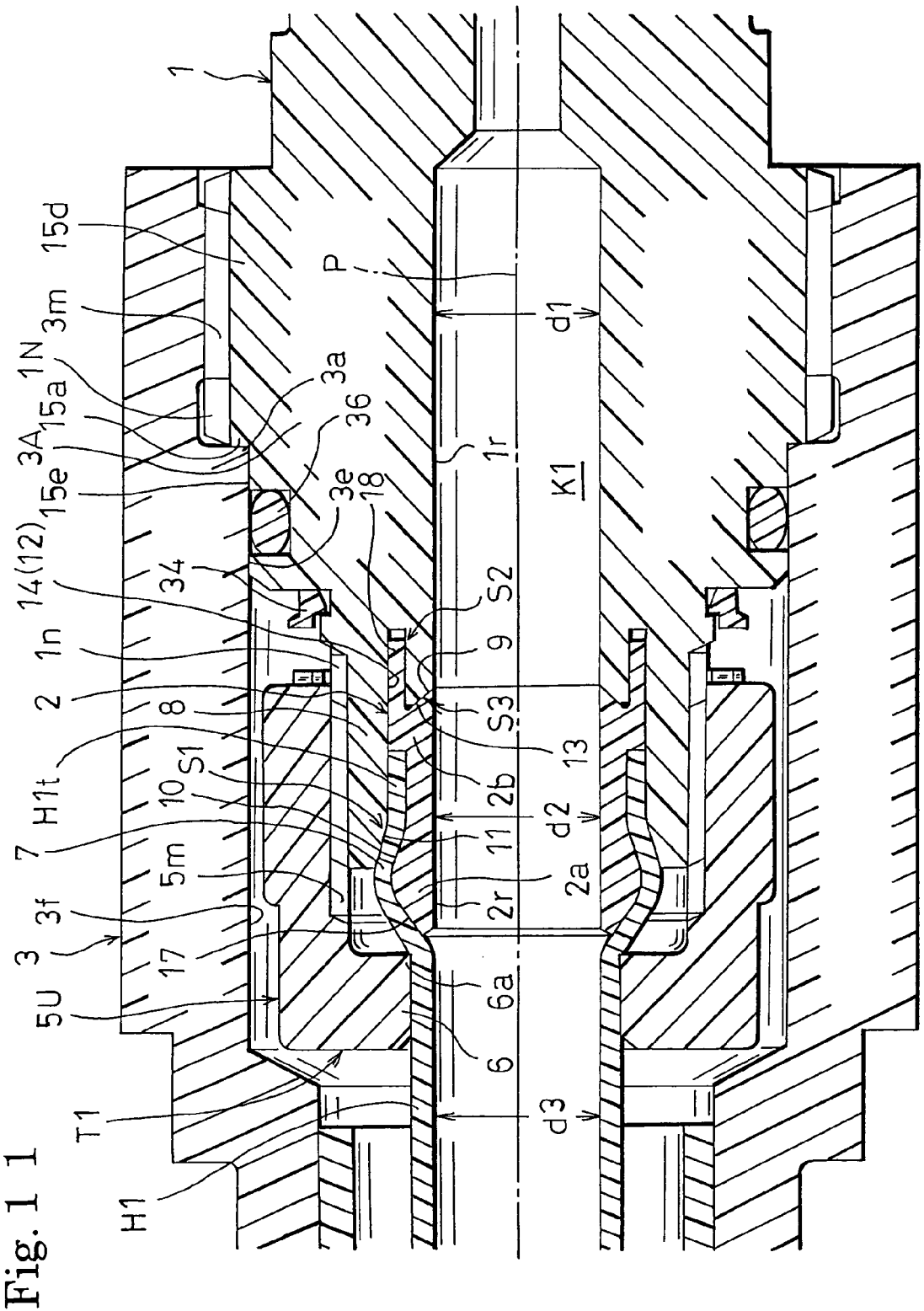
FIG. 11 is an enlarged section view showing a main portion of the structure of an inner-pipe joint portion in FIG. 10.
Figure 12:
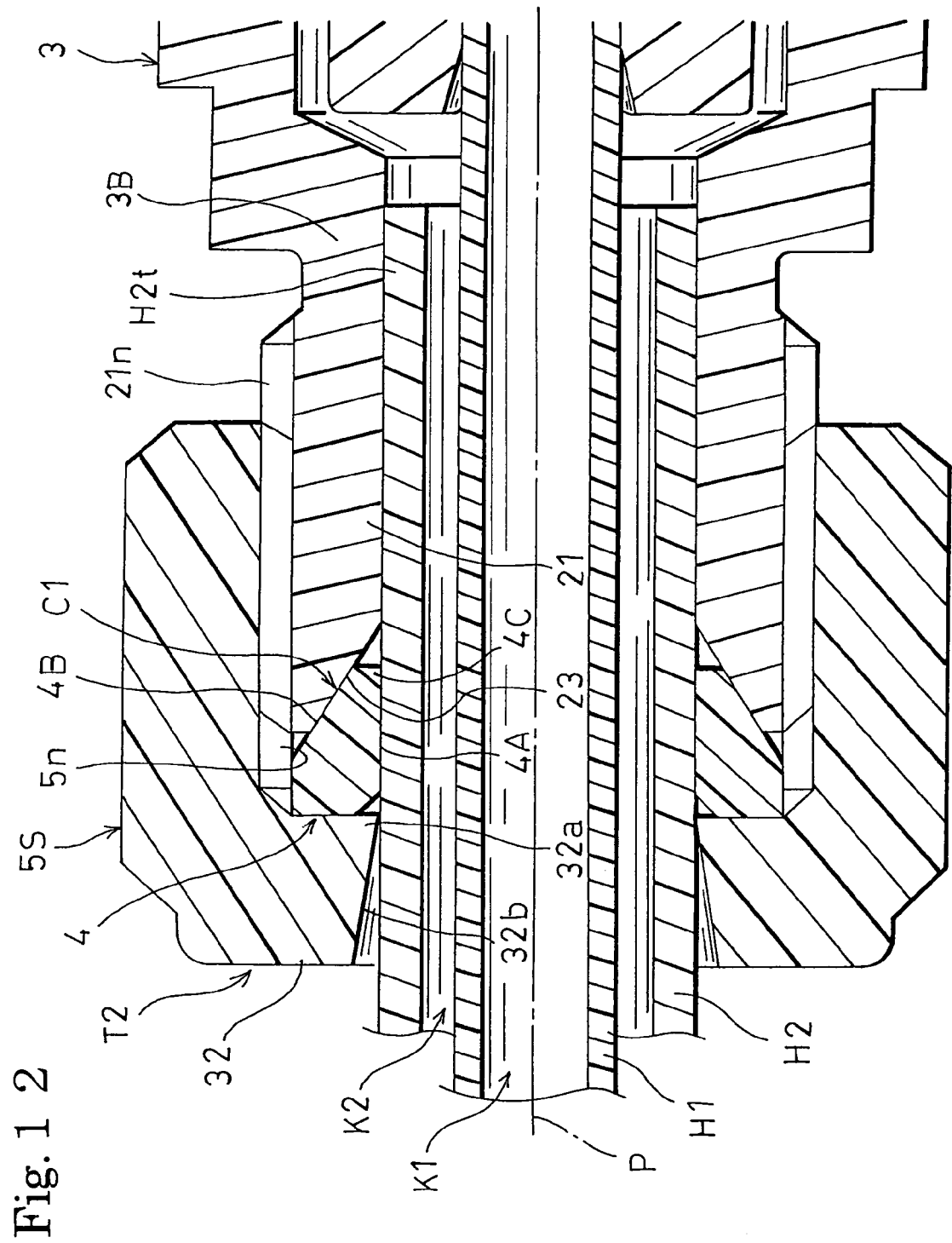
FIG. 12 is an enlarged section view showing a main portion of the structure of an outer-pipe joint portion in FIG. 10.
Figure 16:
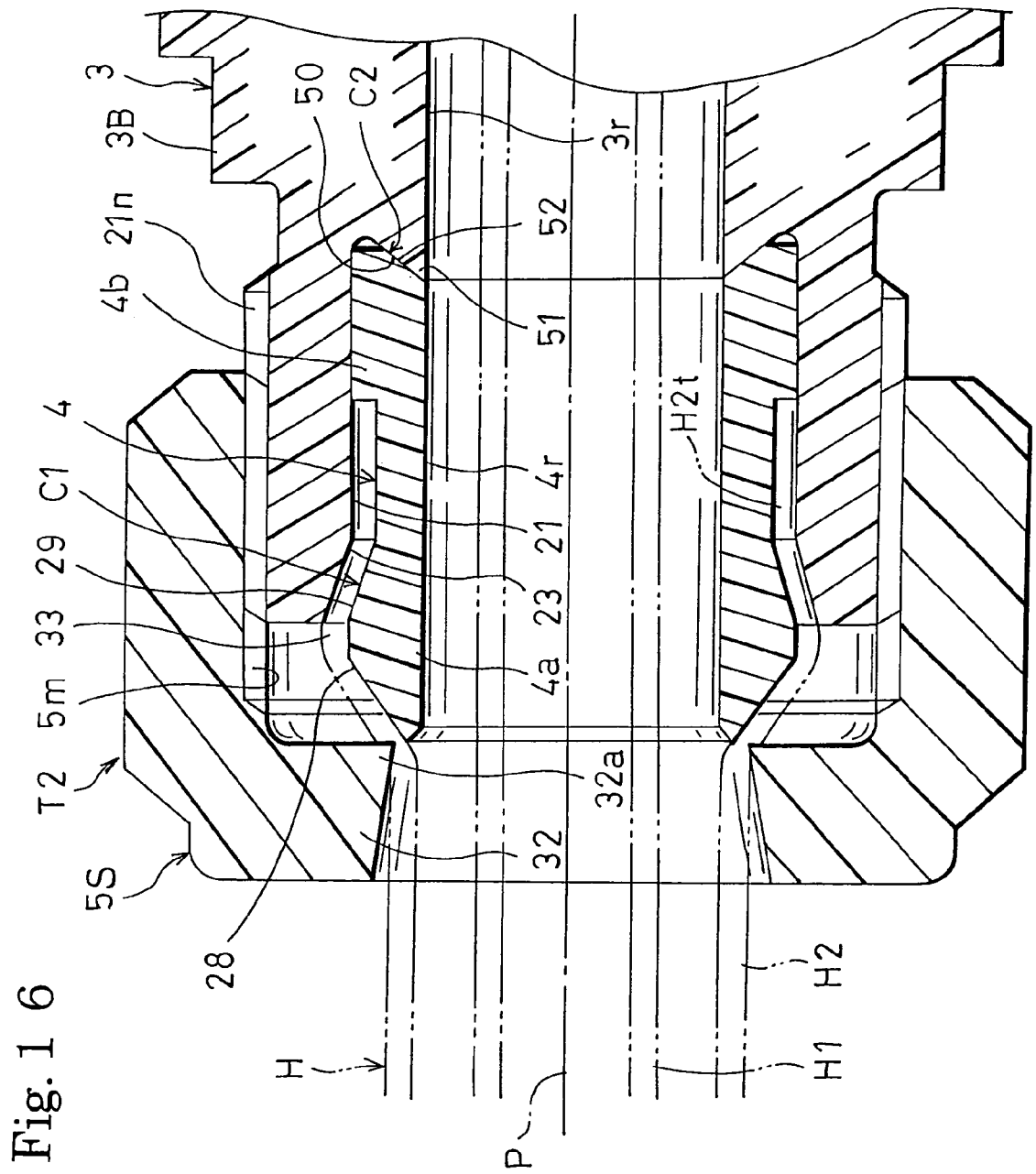
FIG. 16 is a section view showing a main portion of the structure of an outer-pipe joint portion in Embodiment 11.
Figure 17:
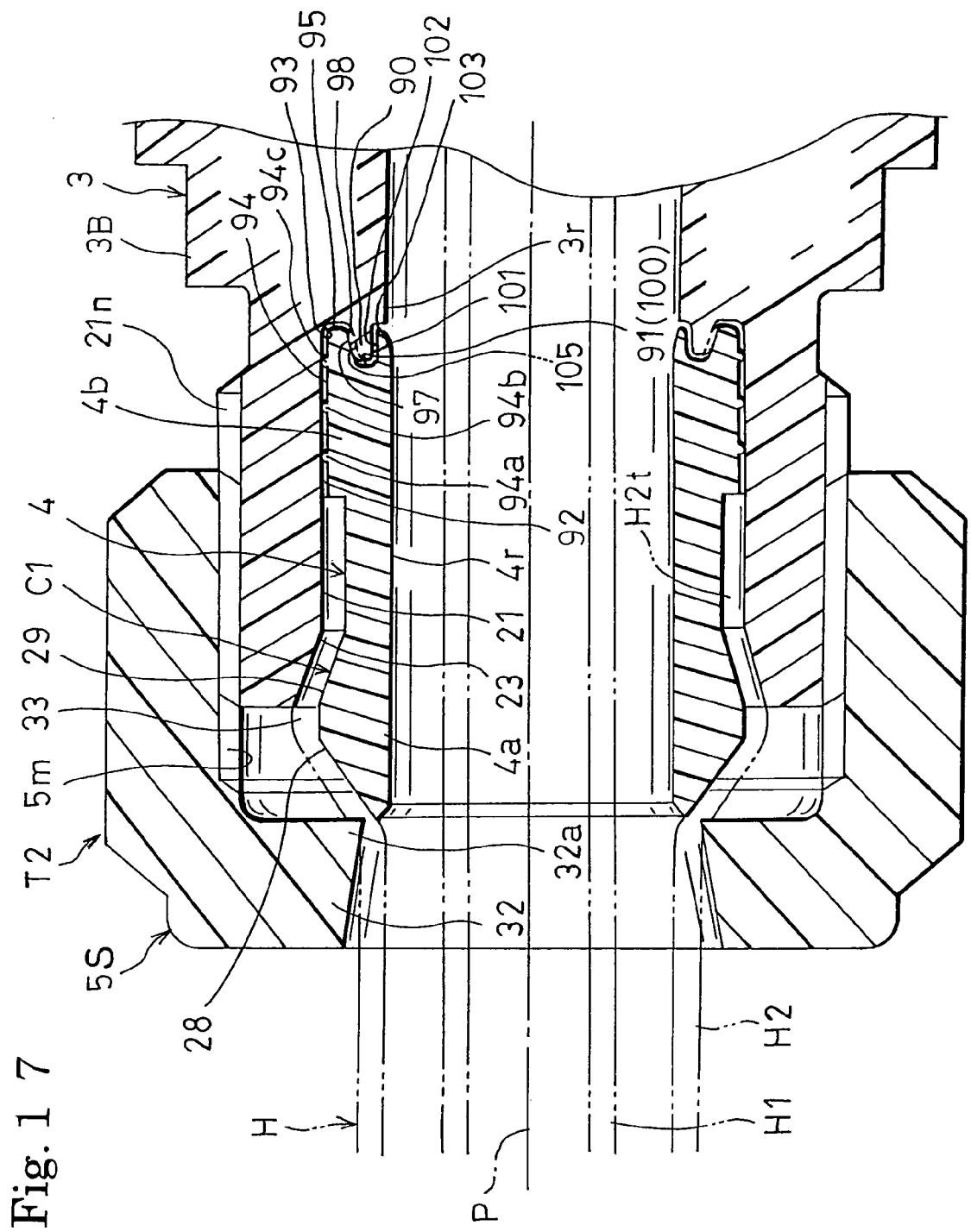
FIG. 17 is a section view showing a main portion of the structure of an outer-pipe joint portion in Embodiment 12.
Figure 18:
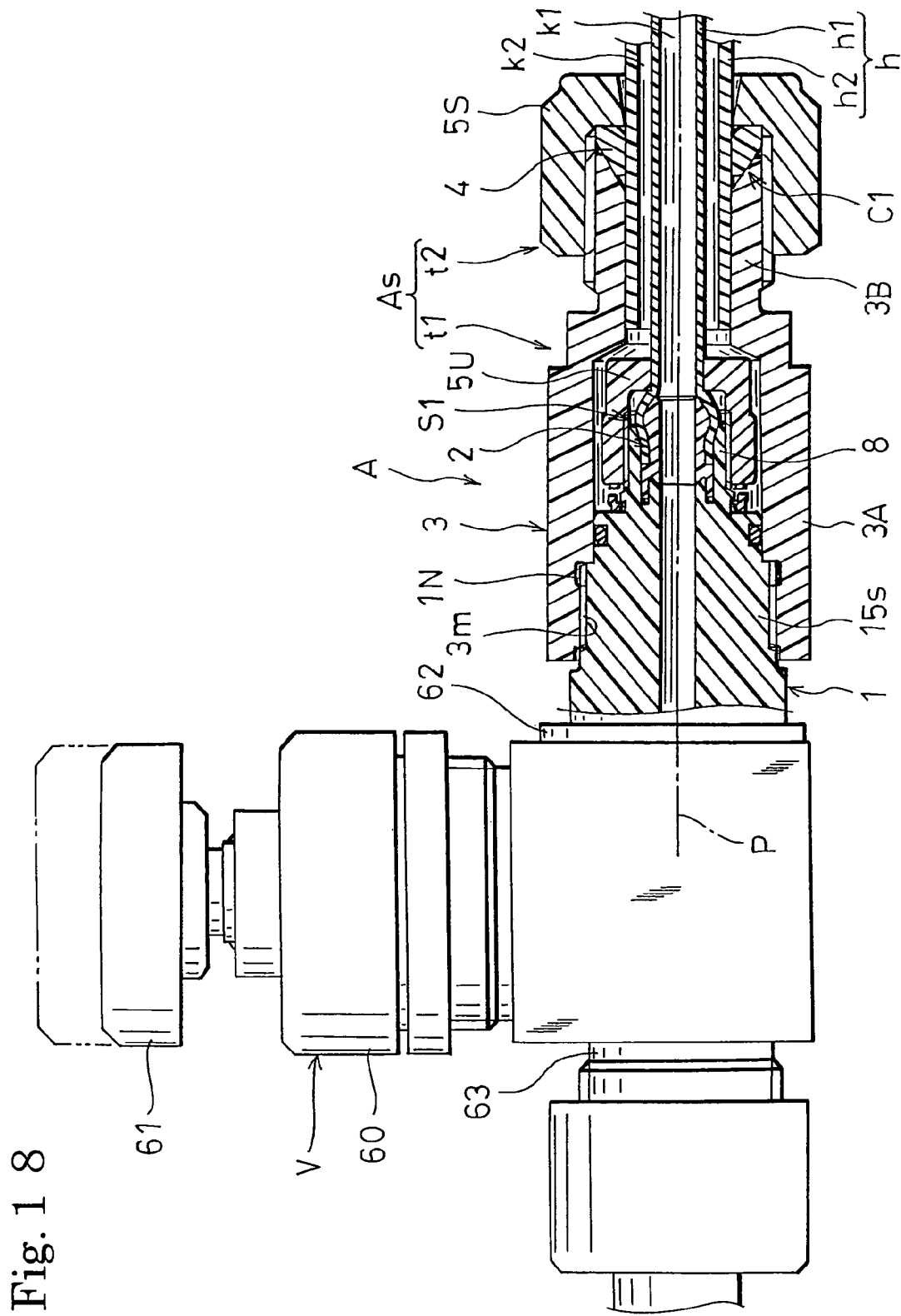
FIG. 18 is a side view of a double-pipe joint in Embodiment 13.

Hereinafter, embodiments of the double-pipe joint of the second invention will be described with reference to the accompanying drawings. FIGS. 10 to 12 show a section view of the whole double-pipe joint of Embodiment 7 which is used for connecting and coupling double pipes, a section view of an inner joint portion, and a section view of an outer joint portion, and FIGS. 13 to 17 show main portions of double-pipe joints of Embodiment 8 to 12, respectively. FIG. 18 is a side view showing the whole double-pipe joint of Embodiment 13 which is used for connecting and coupling a valve and a double pipe. FIGS. 19 to 24 are views showing various sealing structures of inner and outer joint bodies.

Embodiment 7

As shown in FIGS. 10 to 12, the double-pipe joint A of Embodiment 7 is used for connecting and coupling double pipes H, h which have different diameters, and has eleven main components in total, or one inner-pipe joint body 1, a pair of large and small inner-pipe sleeves 2, 2, a pair of large and small inner-pipe union nuts 5U, 5U, a pair of large and small outer-pipe joint bodies 3, 3, a pair of large and small outer-pipe sleeves 4, 4, and a pair of large and small outer-pipe union nuts 5S, 5S. The double-pipe joint is configured by a small joint portion As for the small-diameter double pipe which is shown in the right side of FIG. 10, and a large joint portion Ad for the large-diameter double pipe which is shown in the left side of FIG. 10.

Each of large and small inner joint portions T1, t1 is configured by the inner-pipe joint body 1, the inner-pipe sleeve 2, and the inner-pipe union nut 5U, and each of large and small outer joint portions T2, t2 is configured by the outer-pipe joint body 3, the outer-pipe sleeve 4, and the outer-pipe union nut 5S. The double-pipe joint A is bilaterally asymmetric. The inner-pipe sleeve 2 and the like of the small joint portion As are different only in size from those of the large joint portion Ad, and identical in shape and function. For the sake of convenience, the components are denoted by the reference numerals.

As shown in FIG. 10, the large and small double pipes H, h to be used in the double-pipe joint A are configured by inner pipes H1, h1, and outer pipes H2, h2 which surround the inner pipes, respectively. The pipes H1, h1, H2, and h2 are formed by tube members made of fluororesin such as PTFE or PFA. First spaces K1, k1 which are the interiors of the inner pipes H1, h1 are transporting paths for a fluid. Second spaces K2, k2 which are spaces between the inner pipes H1, h1 and the outer pipes H2, h2 function as a buffering space for leakage prevention which prevents a fluid leaking from the inner pipes H1, h1 caused by any reason from leaking to the outside. Next, the structure of the double-pipe joint A will be described in detail with respect to the inner and outer joint portions T1, T2 on the large-diameter side, i.e., the large joint portion Ad.

As shown in FIGS. 10 and 11, the inner joint portion T1 has: an inner-pipe receiving port 8 for receiving an inner-pipe end portion H1t of the inner-pipe joint body 1 in an inward fitting state; a cylindrical inner-pipe sleeve 2 which is pressingly inserted and fitted into the inner-pipe end portion H1t; an inner-pipe union nut 5U which is fitted onto the inner-pipe end portion H1t, and which is screwable with the inner-pipe receiving port 8; and an inner-pipe sealing face 11 which is formed in the inner-pipe receiving port 8. The inner joint portion is configured so that the inner-pipe end portion H1t is pressed from the outer side by fastening due to screw advancement of the inner-pipe union nut 5U toward the inner-pipe receiving port 8. By the pressing function, the inner-pipe end portion H1t and the inner-pipe sealing face 11 are caused to be in close contact with each other, thereby forming the inner-pipe sealing portion S1.

As shown in FIGS. 10 and 11, the inner-pipe joint body 1 is formed as a cylindrical member made of fluororesin such as PFA having: a barrel wall portion 15; a cylindrical receiving port 8 which is opened in the end of the barrel wall portion 15; and an annular protrusion (an example of the join end portions) 16 which is separately formed on the inner diameter side of the receiving port 8. The barrel wall portion 15 has a large-diameter barrel portion 15d for configuring the large joint portion Ad, and a small-diameter barrel portion 15s for the small joint portion As. External threads 1N, 1N to which the outer-pipe joint bodies 3 are to be screwed are formed on the outer peripheries of the large-diameter barrel portion 15d and the small-diameter barrel portion 15s, respectively.

First to third sealing faces 11 to 13 are disposed inside each of the receiving ports 8 of the inner-pipe joint body 1. The first sealing face 11 is formed in the inlet of the receiving port 8 by a tapered face which is gradually made larger in diameter as further moving in a direction crossing the axis P, i.e., toward an outer side with respect to the direction of the axis P. The third sealing face 13 is formed inner than the inlet of the receiving port 8 of the inner-pipe joint body 1 by a tapered face which is gradually made larger in diameter as further moving in a direction crossing the axis P of the inner-pipe joint body 1, i.e., toward an outer side with respect to the direction of the axis P. The second sealing face 12 is configured by an annular groove 14 which is formed in an inner portion of the receiving port 8 of the inner-pipe joint body 1, further outward in a radial direction than the third sealing face 13, in parallel to the axis P. An external thread in is formed in the outer periphery of the receiving port 8 of the inner-pipe joint body 1. The reference numeral 34 denotes a gauge ring which is fitted to the end of the large-diameter barrel wall portion 15d in order to restrict excess fastening of the inner-pipe union nut 5U.

By contrast, the inner-pipe sleeve (inner ring) 2 made of a synthetic resin (for example, fluororesin such as PFA) is pressingly inserted into the inner-pipe end portion H1t. As shown in FIGS. 11 and 12, the inner-pipe sleeve 2 is formed into a sleeve-like shape (cylindrical shape) having: a press-insertion portion 2a which has an abacus bead-like section shape, and which is to be pressingly inserted into the inner-pipe end portion H1t to increase the diameter of the end portion, thereby expanding the end portion so as to have a mountain-like section shape; a projection portion 2b which is continuous to the press-insertion portion 2a, and which is projected from the inner-pipe end portion H1t toward the inner side; and a fluid transporting path 2r which bridges the portions. In the press-insertion portion 2a having a mountain-like section shape, an outward tapered face 17 is formed on one inclined face of the portion, and an inward tapered face 10 which cooperates with the first sealing face 11 to pressingly hold the inner-pipe end portion H1t in an inclined state to form a first sealing portion (an example of the inner-pipe sealing portion) S1 is formed on the other inclined face.

The projection portion 2b has: a projection end face 9 formed by a tapered face which butts against the third sealing face 13 to be in close contact therewith to form a third sealing portion S3; and a cylindrical portion (an example of the annular protrusion) 18 which is to be pressingly inserted into the annular groove 14 that is the second sealing face 12, to form a second sealing portion S2. The diameter d2 of the fluid transporting path 2r of the inner-pipe sleeve 2 is set to be equal to or substantially equal to the inner diameter d3 of the inner pipe H1, thereby allowing the fluid to smoothly flow without stagnating. For the same purpose, the diameter d2 of the fluid transporting path 2r of the inner-pipe sleeve 2 is set also to be equal to the diameter d1 of a fluid path Ir of the inner-pipe joint body 1.

In the inner-pipe union nut 5U made of fluororesin such as PTFE, as shown in FIGS. 10 and 11, an internal thread 5m which is to be screwable with the external thread In of the receiving port 8 of the inner-pipe joint body 1 is formed in the internal periphery, an annular flange 6 is inwardly projected from one end portion, and a pressing edge 6a having an acute or right angle is formed in an axially inner end of the inner peripheral face of the annular flange 6. The inner-pipe end portion H1t into which the inner-pipe sleeve 2 is pressingly inserted is inserted into the receiving port 8 of the inner-pipe joint body 1, and the internal thread 5m of the inner-pipe union nut 5U which is previously loosely fitted to the outer periphery of the inner pipe H1 is screwed with the external thread 1a formed in the outer periphery of the receiving port 8 to be fastened.

In accordance with this fastening, the pressing edge 6a of the inner-pipe union nut 5U butts against an expansion basal portion of a large-diameter portion 7 of the inner-pipe end portion H1t to axially press the inner-pipe sleeve 2. As a result, as shown in FIG. 11, the inner-pipe end portion H1t is pressingly held in an inclined state between the inward tapered face 10 of the inner-pipe sleeve 2 and the first sealing face 11 of the inner-pipe joint body 1, thereby forming a first sealing portion S1, and the cylindrical portion 18 of the inner-pipe sleeve 2 is pressingly inserted into the annular groove 14 which is the second sealing face 12, to form the second sealing portion S2. Furthermore, the projection end face 9 of the inner-pipe sleeve 2 is pressed against the third sealing face 13 of the inner-pipe joint body 1 to form the third sealing portion S3. In this case, the annular groove 14 is set to be sufficiently deeper as compared with the projection length of the cylindrical portion 18, so that the projection end face 9 and the third sealing face 13 are surely pressingly contacted with each other. The first to third sealing portions S1 to S3 exert a sealing function of high reliability in the inner joint portion T1.

As shown in FIGS. 10 and 12, the outer joint portion T2 has: an outer-pipe receiving port 21 for receiving the outer pipe H2 of the outer-pipe joint body 3 in an inward fitting state; an outer-pipe sleeve 4 which is fitted onto the outer pipe H2; and the outer-pipe union nut 5S which is fitted onto the outer pipe H2, and which is screwable with the outer-pipe receiving port 21. The outer joint portion is configured so that it is caused to cooperate with the outer-pipe sleeve 4 to enable the outer pipe H2 and the outer-pipe joint body 3 to be in close contact with each other to form an outer-pipe sealing portion C1, by fastening due to screw advancement of the outer-pipe union nut 5S toward the outer-pipe receiving port 21.

As shown in FIGS. 10 to 12, the outer-pipe joint body 3 is formed into a single long cylindrical part having: a cover cylinder portion 3A in which an internal thread 3m that is screwable with the external thread 1N of the large-diameter barrel portion 15d of the inner-pipe joint body 1 is formed in the inner periphery of a basal end portion; and an outer-pipe attaching portion 3B including the outer-pipe receiving port 21. An external thread 21n is formed in the outer periphery of the outer-pipe attaching portion 3B. An outer-pipe sealing face 23 which is a tapered inner peripheral face that has a forward-expanded tapered shape in the direction of the axis P is formed in the inner peripheral side of the tip end of the outer-pipe receiving port 21.

As shown in FIG. 12, the outer-pipe sleeve 4 is made of fluororesin such as PFA, and has a substantially cylindrical shape. The diameter of the inner peripheral face 4A is set to be equal to or slightly smaller than the outer diameter of the outer pipe H2 so that it can be fitted onto the outer pipe H2. A forward-contracted outer periphery tapered face 4B which is opposed to and contacted with the outer-pipe sealing face 23 of the outer-pipe attaching portion 3B is formed on the inner end of the outer peripheral face of the sleeve. The inner end side is perpendicularly cut to be formed into a strong-press contact engagement portion 4C in which the inner peripheral face of the inner end is strongly pressingly contacted with the outer pipe H2. The outer end side is formed into a perpendicular face which butts against and engages with the inner face of the inward annular flange 32 of the outer-pipe union nut 5S.

In the outer-pipe union nut 5S made of fluororesin such as PFA, as shown in FIGS. 10 and 12, an internal thread 5n which is to be screwable with the external thread 21n of the outer-pipe attaching portion 3B is formed in the internal periphery, an annular flange 32 is inwardly projected from one end portion, and a pressing edge 32a having an acute or right angle is formed in an axially inner end of a through hole 32b which is the inner peripheral face of the annular flange 32. Namely, the outer-pipe sleeve 4 can be freely pressed against the outer-pipe joint body 3 in the direction of the axis P by fastening due to screwing of the internal thread 5n to the external thread 21n of the outer-pipe attaching portion 3B.

In the thus configured outer joint portion T2, first, the outer pipe H2 is inserted from one end side in the direction of the axis P into the through hole 32b of the outer-pipe union nut 5S, the outer-pipe sleeve 4 is fitted onto the inserted outer pipe H2, and then the one end side of the outer pipe H2 is fittingly inserted into the outer-pipe receiving port 21 of the outer-pipe joint body 3, whereby the outer-pipe sleeve 4 is interposed between the annular flange 32 of the outer-pipe union nut 5S and the outer-pipe attaching portion 3B. Under this state, the internal thread 5n of the outer-pipe union nut 5S is screwed with the external thread 21n of the outer-pipe attaching portion 3B to be rotated (screw-advanced), whereby the outer-pipe union nut 5S is gradually fastened to attain predetermined connection. In accordance with the fastening of the outer-pipe union nut 5S, the outer-pipe sleeve 4 is compressed in the direction of the axis P, and the inner end of the outer periphery tapered face 4B butts from the inner end side against the outer-pipe sealing face 23 of the outer-pipe attaching portion 3B.

In accordance with further fastening of the outer-pipe union nut 5S, by the mutual taper opposing contacting function between the outer periphery tapered face 4B and the outer-pipe sealing face 23, the diameter of the outer-pipe sleeve 4 is reduced along the outer-pipe sealing face 23 of the outer-pipe attaching portion 3B, and the whole inner peripheral face 4A is strongly pressed against the outer peripheral face of the outer pipe H2. Although not illustrated, finally, the strong-press contact engagement portion 4C of the inner peripheral face of the inner end of the outer-pipe sleeve 4 locally deforms a part of the outer pipe H2 toward the radially inner side, and even a low fastening torque can provide the outer pipe H2 with a strong locking force. Moreover, the whole or most part of the inner peripheral face 4A of the outer-pipe sleeve 4 is strongly pressed against and closely contacted with the outer peripheral face of the outer pipe H2, and hence it is possible to obtain a high sealing property.

Next, the integration structure of the outer-pipe joint body 3 and the inner-pipe joint body 1 will be described. As shown in FIGS. 10 and 11, a concave step 3a which butts against a convex step 15a in the direction of the axis P formed in the outer periphery of the large-diameter barrel portion 15d of the inner-pipe joint body 1 is formed in a root portion of the internal thread 3m of the cover cylinder portion 3A of the outer-pipe joint body 3. In addition, a fitting inner peripheral face 3e which is closely fitted onto a fitting outer peripheral face 15e formed in the tip end side of the external thread 1N of the large-diameter barrel portion 15d is formed on the cover cylinder portion 3A, and an O-ring 36 which is fitted to an outer peripheral groove (not shown) formed in the fitting outer peripheral face 15e, whereby the fitting inner peripheral face 3e and the fitting outer peripheral face 15e are satisfactorily sealed.

Therefore, the outer-pipe joint body 3 and the inner-pipe joint body 1 are configured so that, in the state where the internal thread 3m and the external thread 1N are screwed with each other, they can be coupled and integrated with each other by fastening them till the convex step 15a and the concave step 3a butt against each other, in a preferable state where a fastening sensation is accompanied. The diameter of a cover inner peripheral face 3f which is continuous to the fitting inner peripheral face 3e is set to a value which is slightly larger than the maximum outer diameter of the inner-pipe union nut 5U. Namely, the outer-pipe joint body 3 is freely screwable with the inner-pipe joint body 1 in a state where the body surrounds the inner-pipe union nut 5U screwed with the inner-pipe receiving port 8. The outer-pipe joint body 3 screwed with the inner-pipe joint body 1, and the inner-pipe union nut 5U screwed with the inner-pipe receiving port 8 are set to be in a positional relationship in which they are close to each other in a radial direction within a relative rotatable range.

When a strong external force acts on the outer pipe H2 in a bending direction, for example, the outer-pipe joint body 3 is bent and displaced by the force with setting the portion screwed with the inner-pipe joint body 1 as the fulcrum. In this case, the inner-pipe union nut 5U which is internally disposed so as to be fitted into the cover cylinder portion 3A functions as a member for supporting from the inner side, and restricts or blocks the bending displacement of the outer-pipe joint body 3. Consequently, there is an advantage that a damage of the double-pipe joint due to distinct deformation can be prevented from occurring.

The double-pipe joint A of Embodiment 7 is configured so that the inner-pipe joint body 1 which is a component of the inner joint portion T1, and the outer-pipe joint body 3 which is a component of the outer joint portion T2 are coupled and integrated with each other by screwing. Therefore, the inner joint portion T1 and the outer joint portion T2 are organically integrated with each other, and compactified in a radial direction. Moreover, the double-pipe joint A has also a function of coaxially holding the positions of the inner pipe H1 and the outer pipe H2 which are connected and coupled to the joint. Therefore, the joint can be provided as a more rational pipe joint.

Embodiment 8

Figure 13:
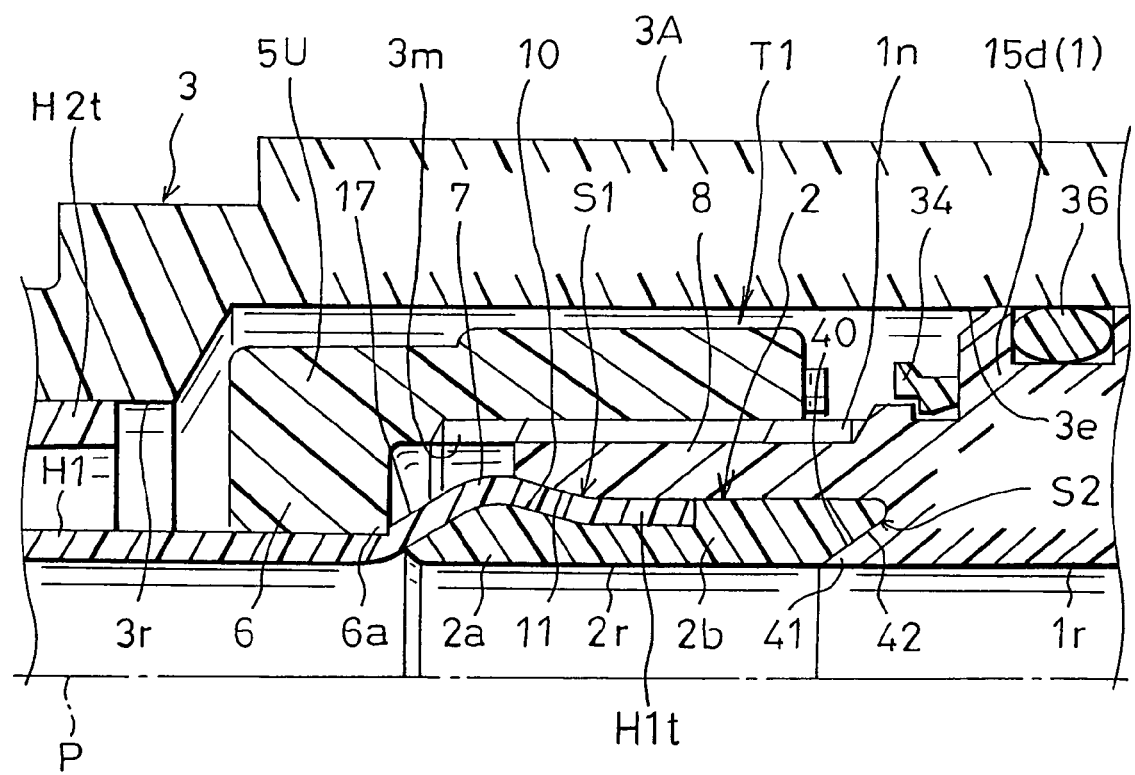
FIG. 13 is a section view showing a main portion of the structure of an inner-pipe joint portion in Embodiment 8.

In the double-pipe joint A of Embodiment 8, the double-pipe joint A and the inner joint portion T1 of Embodiment 7 are configured in a different manner. In the inner joint portion T1 of the first other structure, namely, as shown in FIG. 13, the inner-pipe sleeve 2 has: the press-insertion portion 2a onto which the inner-pipe end portion h1t that is increased in diameter and expanded into a mountain-like section shape is to be pressingly fitted; and the projection portion 2b in which a forward-expended tapered inner peripheral face 42 that is to be pressingly contacted with a forward-contracted tapered outer peripheral face 40 of an annular protrusion 41 is formed in the innermost end. The annular protrusion has the tapered outer peripheral face 40 which is formed on the outer diameter side of the fluid path 1r of the inner-pipe joint body 1.

The inner-pipe sealing face 11 which is configured by the forward-expanded outward tapered face formed in the tip end portion of the inner-pipe receiving port 8, and the forward-expanded inward tapered face 10 in the press-insertion portion 2a having a mountain-like section shape form the inner-pipe sealing portion S1 which pressingly holds the inner-pipe end portion hit in an inclined state between the inner-pipe sealing face 11 and the inward tapered face 10. Furthermore, the second inner-pipe sealing portion S2 formed by pressing contact between the tapered outer peripheral face 40 and the tapered inner peripheral face 42 is configured in a freely formable manner.

Namely, the inner joint portion T1 in Embodiment 8 is identical with that in Embodiment 7 shown in FIG. 11, other than the fitting structure between the inner portion of the inner-pipe sleeve 2 and the inner-pipe joint body 1. In this case, the inner tip end of the projection portion 2b has a cut-away shape, so that the tapered outer peripheral face 40 and the tapered inner peripheral face 42 are surely in press contact with each other to form the effective second inner-pipe sealing portion S2.

Embodiment 9

Figure 14:
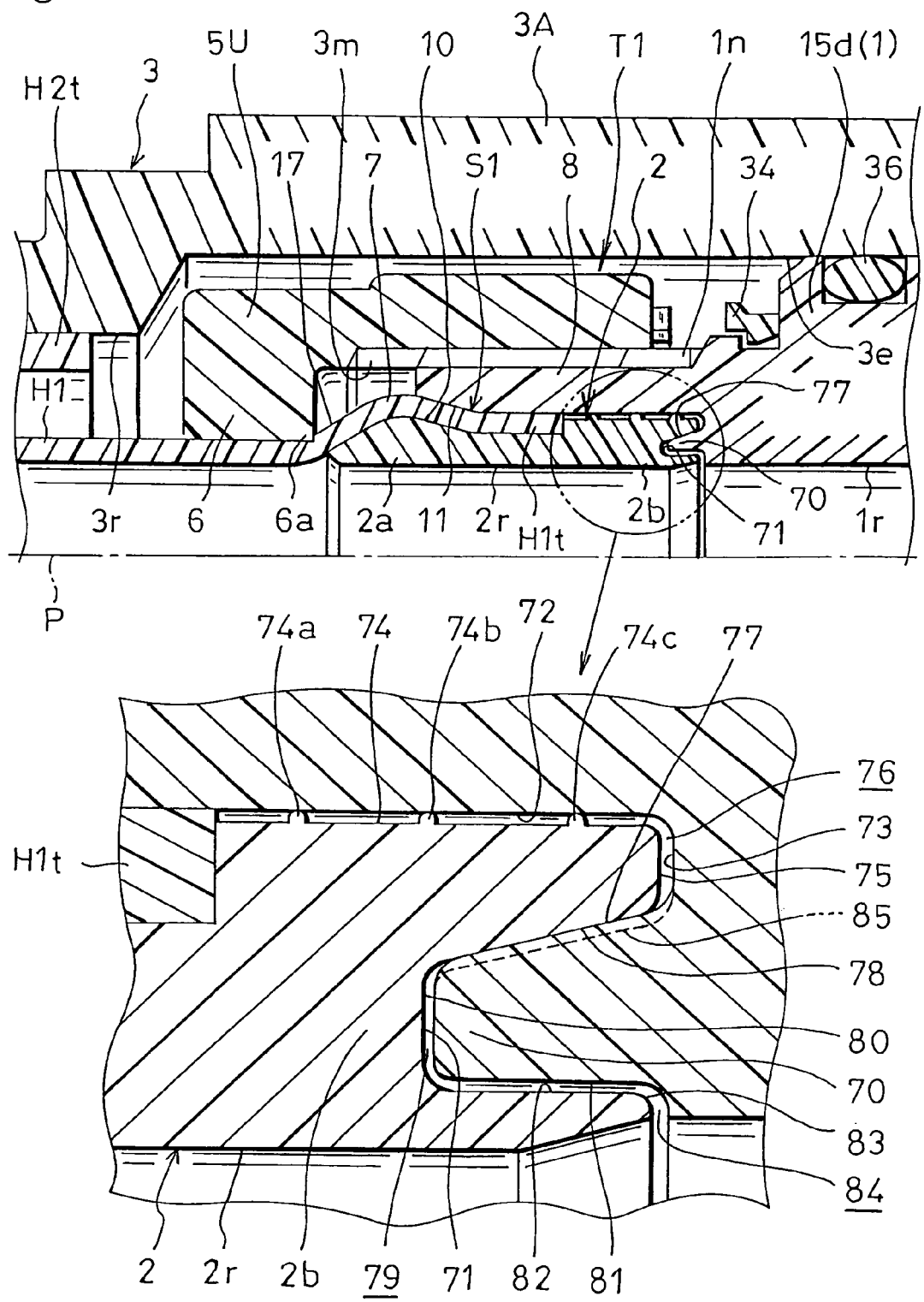
FIG. 14 is a section view showing a main portion of the structure of an inner-pipe joint portion in Embodiment 9.

In the double-pipe joint A of Embodiment 9, the inner joint portion T1 of the double-pipe joint A of Embodiment 7 or 8 is configured in a different manner. As shown in FIG. 14, the inner joint portion T1 of the second other structure is different from the inner joint portion T1 of Embodiment 1 only in the fitting structure between the projection portion 2b of the inner-pipe sleeve 2 and the inner-pipe joint body 1, and identical therewith in the other configuration. In the projection portion 2b of the inner-pipe sleeve 2, namely, an annular recess 71 is formed for housing an annular convex 70 which is formed on the inner-pipe joint body 1, and which is projected in the direction of the axis P.

As shown in FIG. 14, three first protrusions 74a to 74c which are separated from one another by predetermined intervals are annularly formed on a first face 74 which is an outer peripheral face of the projection portion 2b. The first protrusions 74a to 74c have, for example, a trapezoidal section shape, and are formed so that the outer peripheries are in press contact with a cylindrical face 72 of the inner-pipe joint body 1. In this case, the first face 74 of the projection portion 2b is formed substantially in parallel to the cylindrical face 72 which is formed in parallel to the axis P. A second face 75 which is in a noncontact state with an inner flat face 73 of the inner-pipe joint body 1 is formed on the projection portion 2b. A first gap 76 is formed between the second face 75 of the projection portion 2b and the inner flat face 73 of the inner-pipe joint body 1.

The annular recess 71 of the projection portion 2b is configured by: a third face 78 which is inclined by a predetermined angle with respect to the second face 75, and which butts against an inclined face 77 of the annular convex 70 of the inner-pipe joint body 1; a fourth face 80 which extends from the third face 78, and which forms a second gap 79 with respect to the top of the annular convex 70; a fifth face 82 which is formed in a noncontact state with a wall face 81 of the annular convex 70, and in parallel to the axis P; and a sixth face 83 which is continuous to the fifth face 82, and which forms a peripheral edge portion. A third gap 84 is formed by the sixth face 83 of the projection portion 2b and a hem portion of the annular convex 70. A plurality of grooves 85 which elongate along the direction of the axis P, and through which the first gap 76 and the second gap 79 communicate with each other are formed in the inclined face 77 of the annular convex 70 disposed in the inner-pipe joint body 1. The grooves 85 are formed so as to be separated by predetermined angles, and radially elongate.

Embodiment 10

Figure 15:
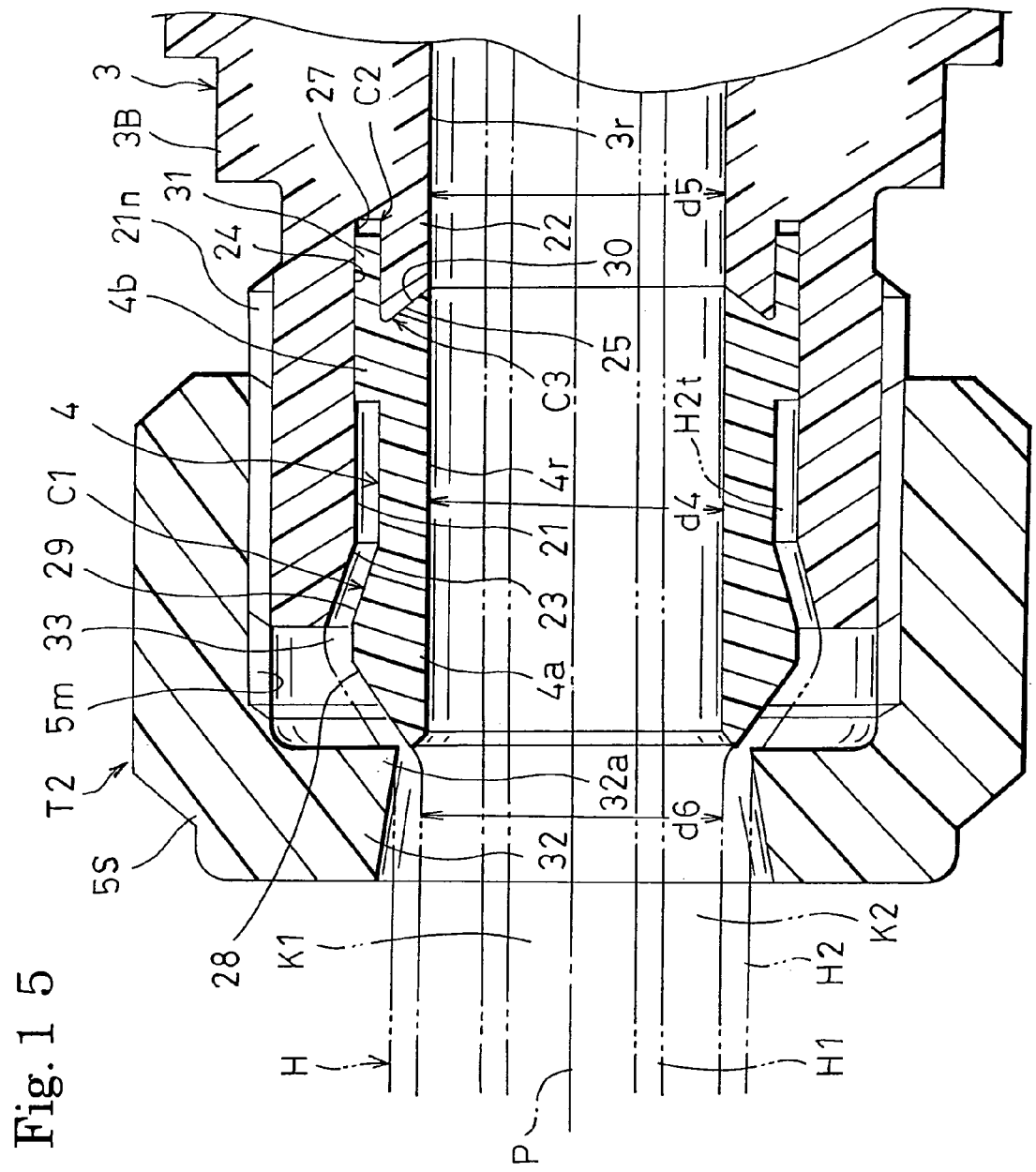
FIG. 15 is a section view showing a main portion of the structure of an outer-pipe joint portion in Embodiment 10.

In the double-pipe joint A of Embodiment 10, the outer joint portion T2 of the double-pipe joint A of Embodiments 7 to 9 is configured in a different manner. In the outer joint portion T2 of the first other structure, namely, as shown in FIG. 15, the outer-pipe sleeve 4 has: the press-insertion portion 4a onto which the outer-pipe end portion H2t that is increased in diameter and expanded into a mountain-like section shape is to be pressingly fitted; the annular protrusion 31 which is to be pressingly inserted into the annular groove 27 that is formed on the outer diameter side of the inner-pipe passing path 3r of the outer-pipe joint body 3; and the tapered outer peripheral face 30 which is pressingly contacted with the forward-expanded tapered inner peripheral face 25 formed in the tip end portion of the cylindrical join end portion 22 that is a portion between the annular groove 27 and the inner-pipe passing path 3r. The outer-pipe sealing face 23 which is configured by the forward-expanded outward tapered face formed in the tip end portion of the outer-pipe receiving port 21, and the forward-expanded inward tapered face 29 in the press-insertion portion 4a having a mountain-like section shape form the outer-pipe sealing portion C1 which pressingly holds the outer-pipe end portion H2t in an inclined state between the outer-pipe sealing face 23 and the inward tapered face 29. The second outer-pipe sealing portion C2 formed by fitting between the annular groove 27 and the annular protrusion 31, and the third outer-pipe sealing portion C3 formed by pressing contact between the tapered inner peripheral face 25 and the tapered outer peripheral face 30 are configured in a freely formable manner.

The structure of the double-pipe joint of Embodiment 10 will be described in more detail. As shown in FIG. 15, the outer-pipe attaching portion 3B constituting the outer joint portion T2 for connecting and coupling the outer pipe H2 in the outer-pipe joint body 3 is formed into a cylindrical portion having: an outer-pipe receiving port 21 which has an external thread 21n in the outer periphery; and an annular protrusion (an example of the join end portions) 22 which is separately formed on the inner diameter side of the receiving port. The reference numeral 35 denotes a gauge ring which is fitted to the outer-pipe attaching portion 3B in order to restrict excess fastening of the union nut 5S. First to third sealing faces 23 to 25 are disposed inside the outer-pipe receiving port 21 of the outer-pipe attaching portion 3B. The first sealing face 23 is formed in the inlet of the outer-pipe receiving port 21 by a tapered face which is gradually made larger in diameter as further moving in a direction crossing the axis P, i.e., toward an outer side with respect to the direction of the axis P. The third sealing face 25 is formed inner than the inlet of the outer-pipe receiving port 21 of the outer-pipe attaching portion 3B by a tapered face which is gradually made larger in diameter as further moving in a direction crossing the axis P of the outer-pipe attaching portion 3B, i.e., toward an outer side with respect to the direction of the axis P. The second sealing face 24 is configured by an annular groove 27 which is formed in an inner portion of the outer-pipe receiving port 21 of the outer-pipe attaching portion 3B, further outward in a radial direction than the third sealing face 25, in parallel to the axis P.

The outer-pipe sleeve (outer-pipe inner ring) 4 made of a synthetic resin such as fluororesin is pressingly inserted into the outer-pipe end portion H2t. As shown in FIG. 15, the outer-pipe sleeve 4 is formed into a sleeve-like shape (cylindrical shape) having: a press-insertion portion 4a which has an abacus bead-like section shape, and which is to be pressingly inserted into the outer-pipe end portion H2t to increase the diameter of the end portion, thereby expanding the end portion so as to have a mountain-like section shape; a projection portion 4b which is continuous to the press-insertion portion 4a, and which is projected from the outer-pipe end portion H2t toward the inner side; and a fluid transporting path 4r which bridges the portions. In the press-insertion portion 4a having a mountain-like section shape, an outward tapered face 28 is formed on one inclined face of the portion, and an inward tapered face 29 which cooperates with the first sealing face 23 to pressingly hold the outer-pipe end portion H2t in an inclined state to form a first sealing portion (an example of the outer-pipe sealing portion) C1 is formed on the other inclined face.

The projection portion 4b has: a projection end face 30 formed by a tapered face which butts against the third sealing face 25 to be in close contact therewith to form a third sealing portion C3; and a cylindrical portion 31 which is to be pressingly inserted into the annular groove 27 which is the second sealing face 24, to form a second sealing portion C2. The diameter d4 of the fluid transporting path 4r of the outer-pipe sleeve 4 is set to be equal to or substantially equal to the inner diameter d6 of the outer pipe H2, thereby allowing the fluid to smoothly flow without stagnating. For the same purpose, the diameter d4 of the fluid transporting path 4r of the outer-pipe sleeve 4 is set also to be equal to the diameter d5 of an inner-pipe passing path 3r of the outer-pipe attaching portion 3B.

In the outer-pipe union nut 5S made of fluororesin such as PFA, as shown in FIGS. 12 and 15, an internal thread 5m which is to be screwed with the external thread 21n of the outer-pipe attaching portion 3B is formed, an annular flange 32 is inwardly projected from one end portion, and a pressing edge 32a having an acute or right angle is formed in an axially inner end of the inner peripheral face of the annular flange 32. The outer-pipe end portion H2t into which the outer-pipe sleeve 4 is pressingly inserted is inserted into the outer-pipe receiving port 21 of the outer-pipe attaching portion 3B, and the internal thread 5n of the outer-pipe union nut 5S which is previously loosely fitted to the outer periphery of the outer-pipe end portion H2t is screwed with the external thread 21n of the outer-pipe attaching portion 3B to be fastened.

In accordance with this fastening, the pressing edge 32a of the outer-pipe union nut 5s butts against an expansion basal portion of a large-diameter portion 33 of the outer pipe H2 to axially press the outer-pipe sleeve 4. As a result, as shown in FIG. 15, the outer-pipe end portion H2t is pressingly held in an inclined state between the inward tapered face 29 of the outer-pipe sleeve 4 and the first sealing face 23 of the outer-pipe attaching portion 3B, thereby forming the first sealing portion C1, and the cylindrical portion 31 which is the second sealing face 24 of the outer-pipe sleeve 4 is pressingly inserted into the annular groove 27 to form the second sealing portion C2. Furthermore, the projection end face 30 of the outer-pipe sleeve 4 is pressed against the third sealing face 25 of the outer-pipe attaching portion 3B to form the third sealing portion C3. In this case, the annular groove 27 is set to be sufficiently deeper as compared with the projection length of the cylindrical portion 31, so that the projection end face 30 and the third sealing face 25 are surely pressingly contacted with each other. The first to third sealing portions C1 to C3 exert a sealing function of high reliability in the outer joint portion T2.

Embodiment 11

In the double-pipe joint A of Embodiment 11, the outer joint portion T2 of the double-pipe joint A of Embodiments 7 to 9 is configured in a different manner. In the outer joint portion T2 of the second other structure, as shown in FIG. 16, the outer-pipe sleeve 4 has: the press-insertion portion 4a onto which the outer-pipe end portion h2t that is increased in diameter and expanded into a mountain-like section shape is to be pressingly fitted; and the projection portion 4b in which a forward-expended tapered inner peripheral face 52 that is to be pressingly contacted with a tapered outer peripheral face 50 of an annular protrusion 51, the peripheral face having a forward-contracted tip end, is formed in the innermost end. The annular protrusion has the tapered outer peripheral face 50 which is formed on the outer diameter side of the inner-pipe passing path 3r of the outer-pipe joint body portion 3B.

The outer-pipe sealing face 23 which is configured by the forward-expanded outward tapered face formed in the tip end portion of the outer-pipe receiving port 21, and the forward-expanded inward tapered face 29 in the press-insertion portion 4a having a mountain-like section shape form the outer-pipe sealing portion C1 which pressingly holds the outer-pipe end portion h2t in an inclined state between the outer-pipe sealing face 23 and the inward tapered face 29. Furthermore, the second outer-pipe sealing portion C2 formed by pressing contact between the tapered outer peripheral face 50 and the tapered inner peripheral face 52 is configured in a freely formable manner.

Namely, the outer joint portion T2 in Embodiment 11 is identical with that in Embodiment 7 shown in FIG. 12, other than the fitting structure between the inner portion of the outer-pipe sleeve 4 and the outer-pipe joint body portion 3B. In this case, the inner tip end of the projection portion 4b has a cut-away shape, so that the tapered outer peripheral face 50 and the tapered inner peripheral face 52 are surely in press contact with each other to form the effective second outer-pipe sealing portion C2.

Embodiment 12

In the double-pipe joint A of Embodiment 12, the outer joint portion T2 of the double-pipe joint A of Embodiments 7 to 9 is configured in a different manner. As shown in FIG. 17, the outer joint portion T2 of the second other structure is different from that of Embodiment 7 only in the fitting structure between the projection portion 4b of the outer-pipe sleeve 4 and the outer-pipe joint body portion 3B, and identical therewith in the other configuration. In the projection portion 4b of the outer-pipe sleeve 4, namely, an annular recess 91 is formed for housing an annular convex 90 which is formed on the outer-pipe joint body portion 3B, and which is projected in the direction of the axis P. The outer joint portion T2 has the same structure as that shown in an enlarged view of the portion which is circled in FIG. 14. The description of Embodiment 9 is applied also to the embodiment. For reference, however, the reference numerals used in FIG. 14 are indicated in parentheses. The enlarged view is identical with FIG. 14, and, for reference, components which cannot be denoted by reference numerals in FIG. 17 are indicated in the description by the reference numerals of FIG. 14 in parentheses.

As shown in FIG. 17, three first protrusions 94a to 94c which are separated from one another by predetermined intervals are annularly formed on a first face 94 which is an outer peripheral face of the projection portion 4b. The first protrusions 94a to 94c have, for example, a trapezoidal section shape, and are formed so that the outer peripheries are in press contact with a cylindrical face 92 of the outer-pipe joint body portion 3B. In this case, the first face 94 of the projection portion 4b is formed substantially in parallel to the cylindrical face 92 which is formed in parallel to the axis P. A second face 95 which is in a noncontact state with an inner flat face 93 of the outer-pipe joint body portion 3B is formed on the projection portion 4b. A first gap (76) is formed between the second face 95 of the projection portion 4b and the inner flat face 93 of the outer-pipe joint body portion 3B.

The annular recess 91 of the projection portion 4b is configured by: a third face 98 which is inclined by a predetermined angle with respect to the second face 95, and which butts against an inclined face 97 of the annular convex 90 of the outer-pipe joint body 3B; a fourth face 100 which extends from the third face 98, and which forms a second gap (79) with respect to the top of the annular convex 90; a fifth face 102 which is formed in a noncontact state with a wall face 101 of the annular convex 90, and in parallel to the axis P; and a sixth face 103 which is continuous to the fifth face 102, and which forms a peripheral edge portion. A third gap (84) is formed between the sixth face 103 of the projection portion 4b and a hem portion of the annular convex 90. A plurality of grooves 105 which elongate along the direction of the axis P, and through which the first gap (76) and the second gap (79) communicate with each other are formed in the inclined face 97 of the annular convex 90 disposed in the outer-pipe joint body 3B. The grooves 105 are formed so as to be separated by predetermined angles, and radially elongate.

Embodiment 13

The double-pipe joint A of Embodiment 13 is used for connecting and coupling a valve V and a double pipe h, and has a configuration corresponding to the small joint portion As of the double-pipe joint A of Embodiment 7 having the outer joint portion T2 of Embodiment 10. As shown in FIG. 18, the valve (manual stop valve) V has a valve body 60, a rotation operating portion 61, a pair of fluid supplying/discharging portions 62, 63, etc. For example, the double-pipe joint A is configured so that the double pipe h is freely connectable and couplable to the supplying portion 62 which is a fluid inlet of the valve body 60. The double-pipe joint has: the inner joint portion T1 having an inner-pipe joint body 1 which is formed integrally with the supplying portion 62; and the outer joint portion T2.

The inner-pipe joint body 1 having a shape which is obtained by splitting the inner-pipe joint body 1 of the double-pipe joint A of Embodiment 7 and the like shown in FIG. 10, along a middle portion in the direction of the axis P is formed in the supplying portion 62. The other configuration is identical with the respective components of the double-pipe joint A of the corresponding embodiments. In FIG. 18, therefore, main components are denoted by reference numerals. The further detailed description of the structure is omitted. Alternatively, a double-pipe joint A having a structure corresponding to the large joint portion Ad is configured in the supplying portion 62.

[Sealing Structure of Joint Bodies]

In addition to the structure shown in FIGS. 10 and 11, various means such as the following first to sixth other sealing structures can realize the sealing structure in the screwing portions of the pair of large and small outer-pipe joint bodies 3, 3 and the inner-pipe joint body 1. The other sealing structures will be briefly described.

[First Other Sealing Structure]

Figure 19:
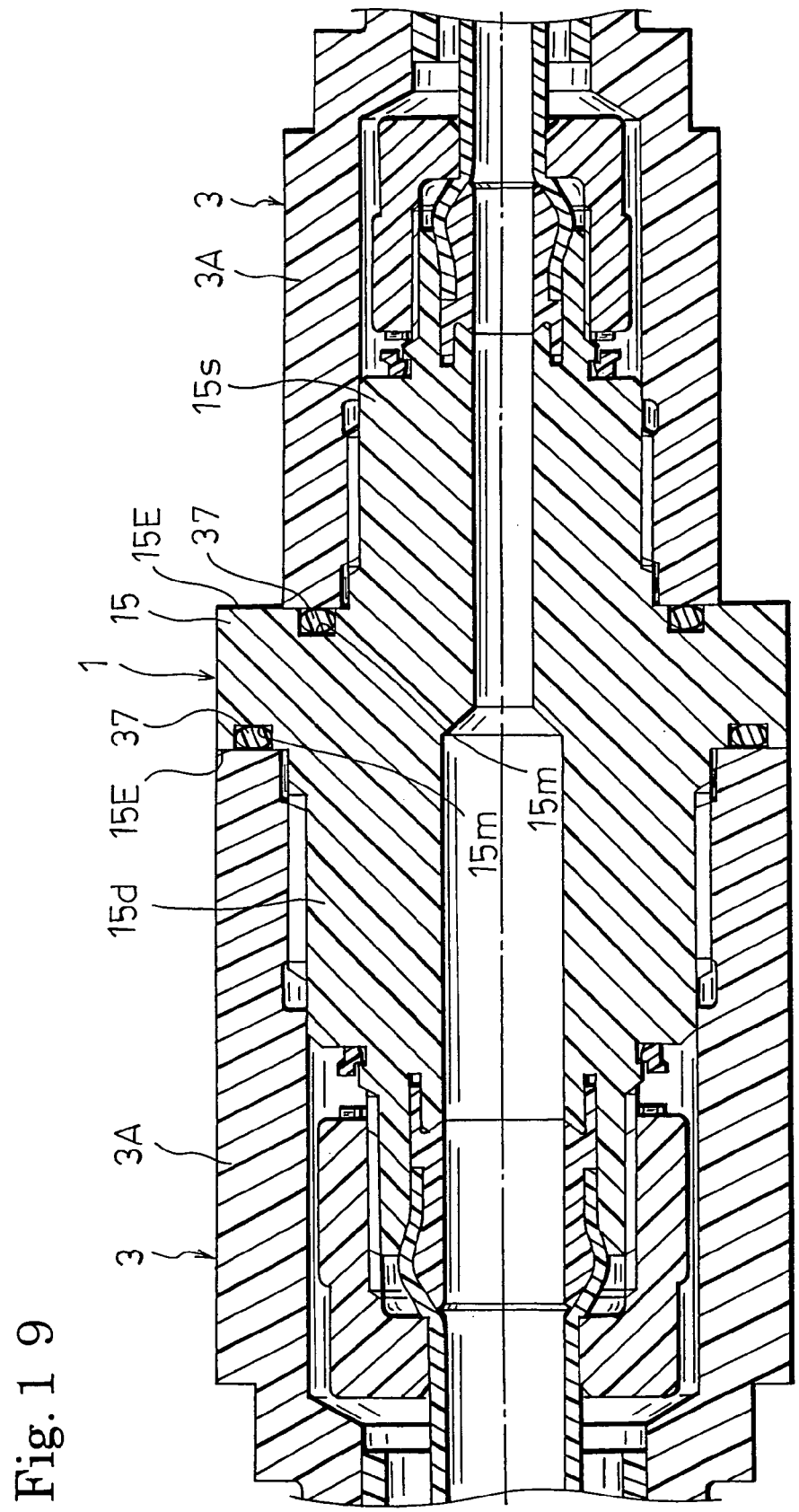
FIG. 19 is a section view showing a main portion of a first other sealing structure of inner and outer joint bodies.

As shown in FIG. 19, the first other sealing structure may be a structure in which stop walls 15E against which end walls 3a of large and small cover cylinder portions 3A butt are formed in the left and right sides of the barrel wall portion 15 of the inner-pipe joint body 1, respectively, and O-rings 37 are disposed in annular grooves 15m which are recessed in the stop walls 15E so as to be laterally opened. When the outer-pipe joint bodies 3 are screwingly advanced to attain a fastened state where the cover cylinder portions 3A butt against the stop walls 15E, the joint bodies 1, 3 are sealed by the O-rings 37.

[Second Other Sealing Structure]

Figure 20:
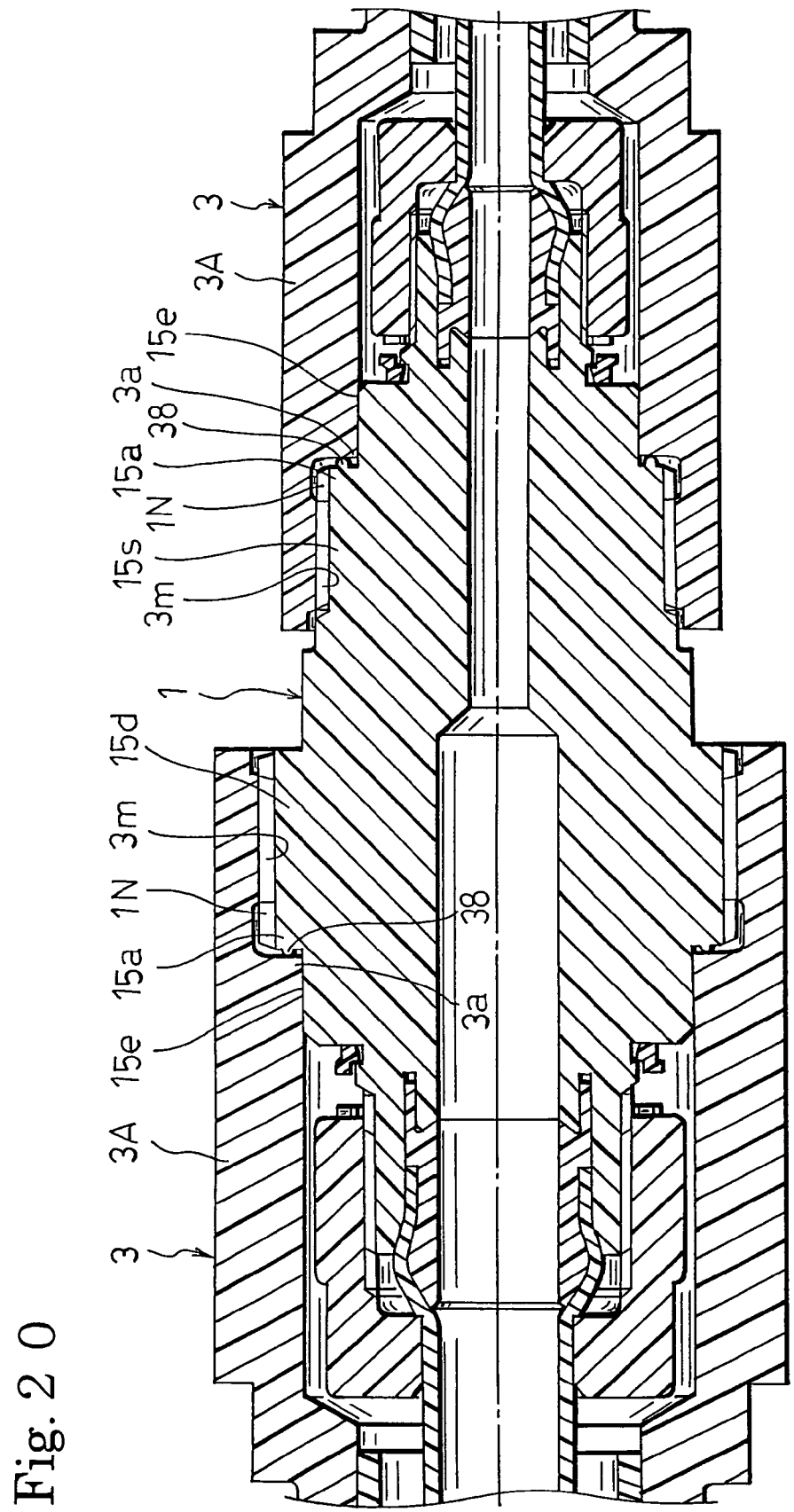
FIG. 20 is a section view showing a main portion of a second other sealing structure of the inner and outer joint bodies.

As shown in FIG. 20, the second other sealing structure may be a structure in which a lip seal 38 that is a laterally projecting annular small protrusion is formed on at least one of a side wall of the convex step 15a of the inner-pipe joint body 1 and that of the concave step 3a of the outer-pipe joint body 3. In FIG. 20, for example, the lip seal 38 is formed on the outer-pipe joint body 3. When the outer-pipe joint body 3 is screwingly advanced to cause the concave step 3a to butt against the convex step 15a, the lip seal 38 is collapsingly deformed to satisfactorily seal the gap between the concave step 3a and the convex step 15a.

[Third Other Sealing Structure]

Figure 21:
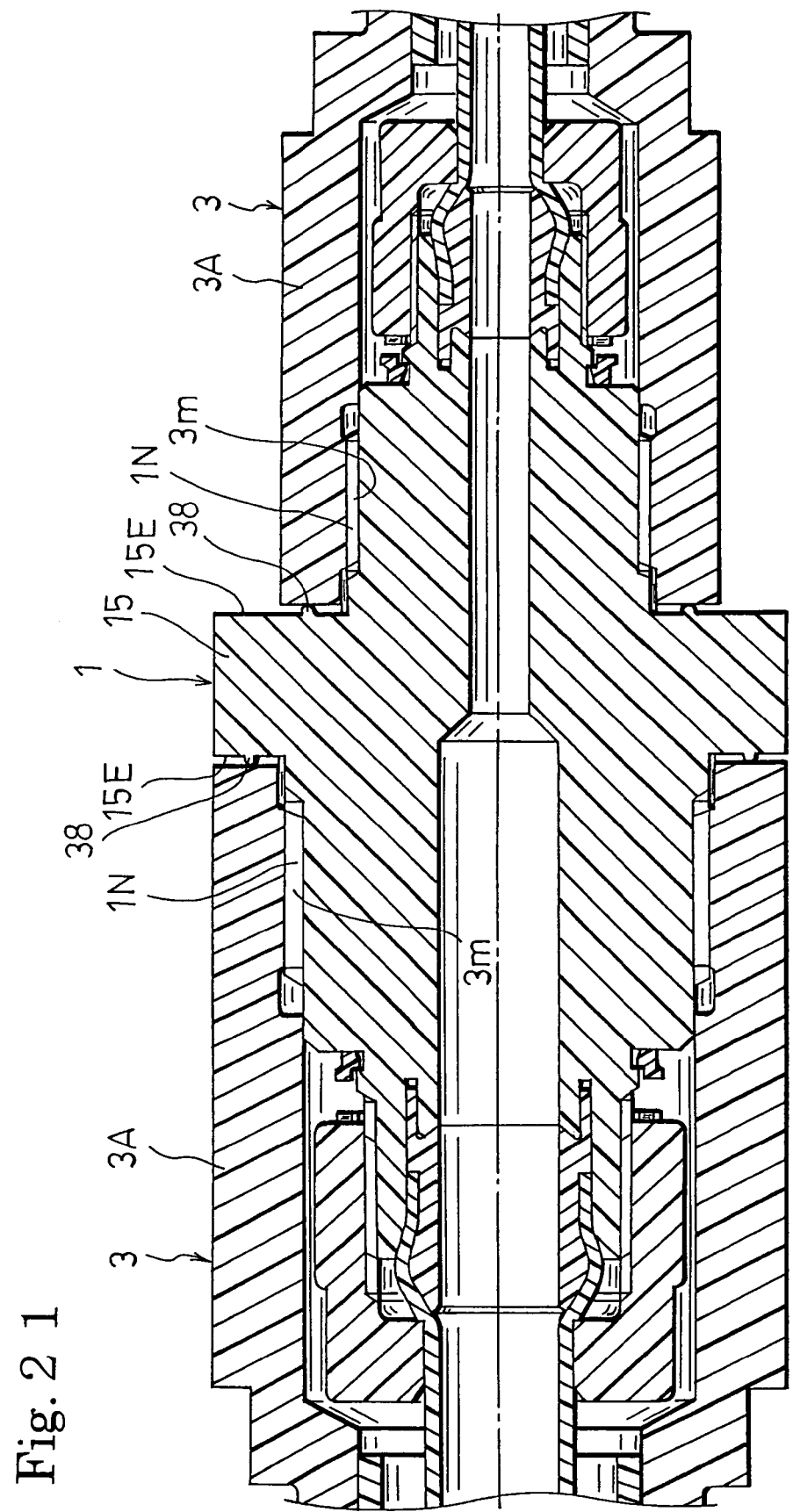
FIG. 21 is a section view showing a main portion of a third other sealing structure of the inner and outer joint bodies.

As shown in FIG. 21, the third other sealing structure is a structure in which the O-rings 37 in the above-described first other sealing structure (see FIG. 19) are replaced by lip seals 38. In FIG. 21, for example, the lip seal 38 which is a small annular protrusion that is laterally projected is formed on the stop wall 15E of the inner-pipe joint body 1. When the outer-pipe joint body 3 is screwingly advanced to cause the end wall of the cover cylinder portions 3A to butt against the stop wall 15E, the lip seal 38 is collapsingly deformed to satisfactorily seal the gap between the end wall of the cover cylinder portions 3A and the stop wall 15E.

[Fourth Other Sealing Structure]

Figure 22:
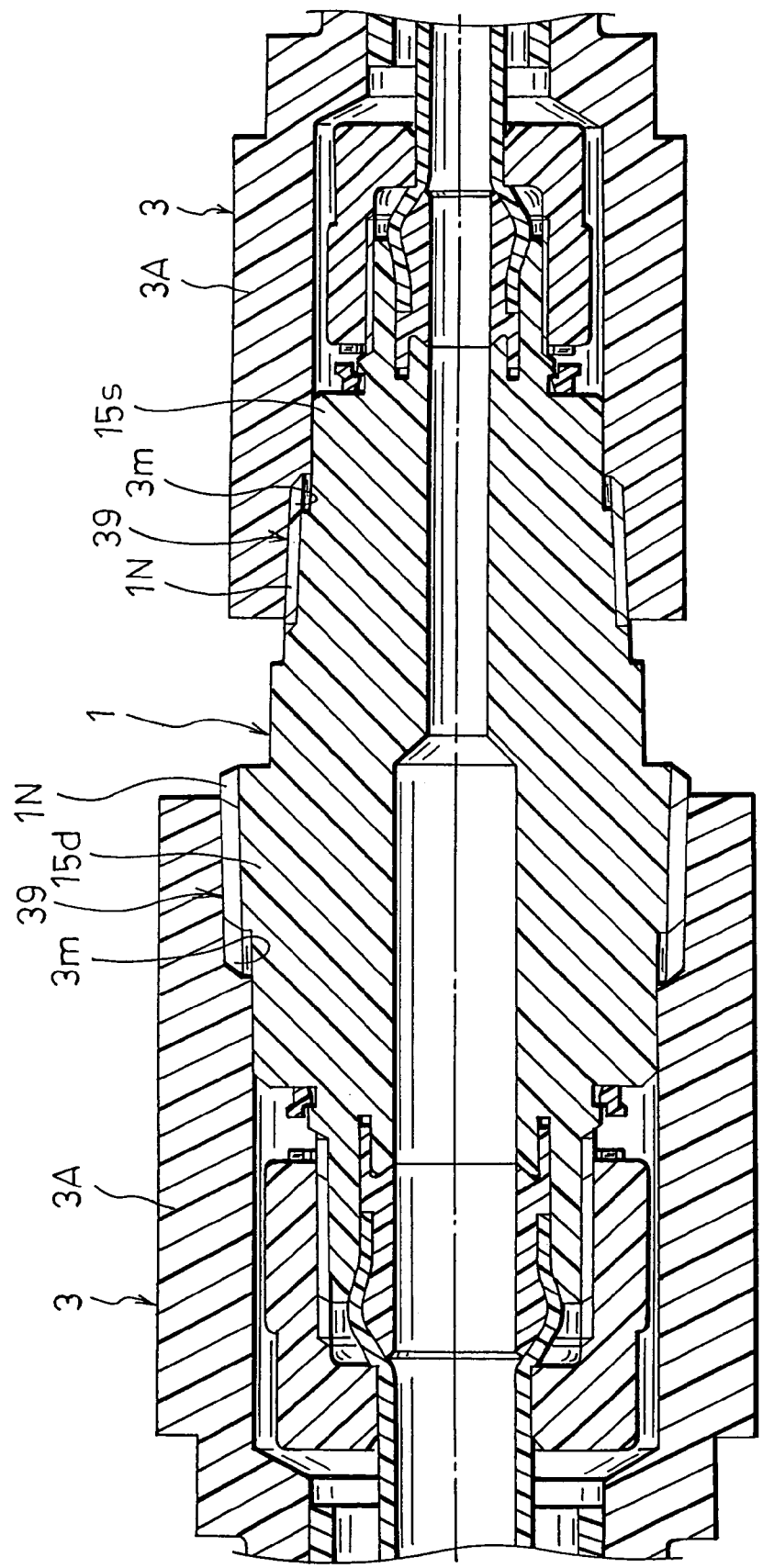
FIG. 22 is a section view showing a main portion of a fourth other sealing structure of the inner and outer joint bodies.

As shown in FIG. 22, the fourth other sealing structure may be a structure in which the external threads 1N of the inner-pipe joint body 1 and the internal threads 3m of the outer-pipe joint bodies 3 are formed as tapered screws 39, and sealing is attained by fastening the tapered screws 39.

[Fifth Other Sealing Structure]

Figure 23:
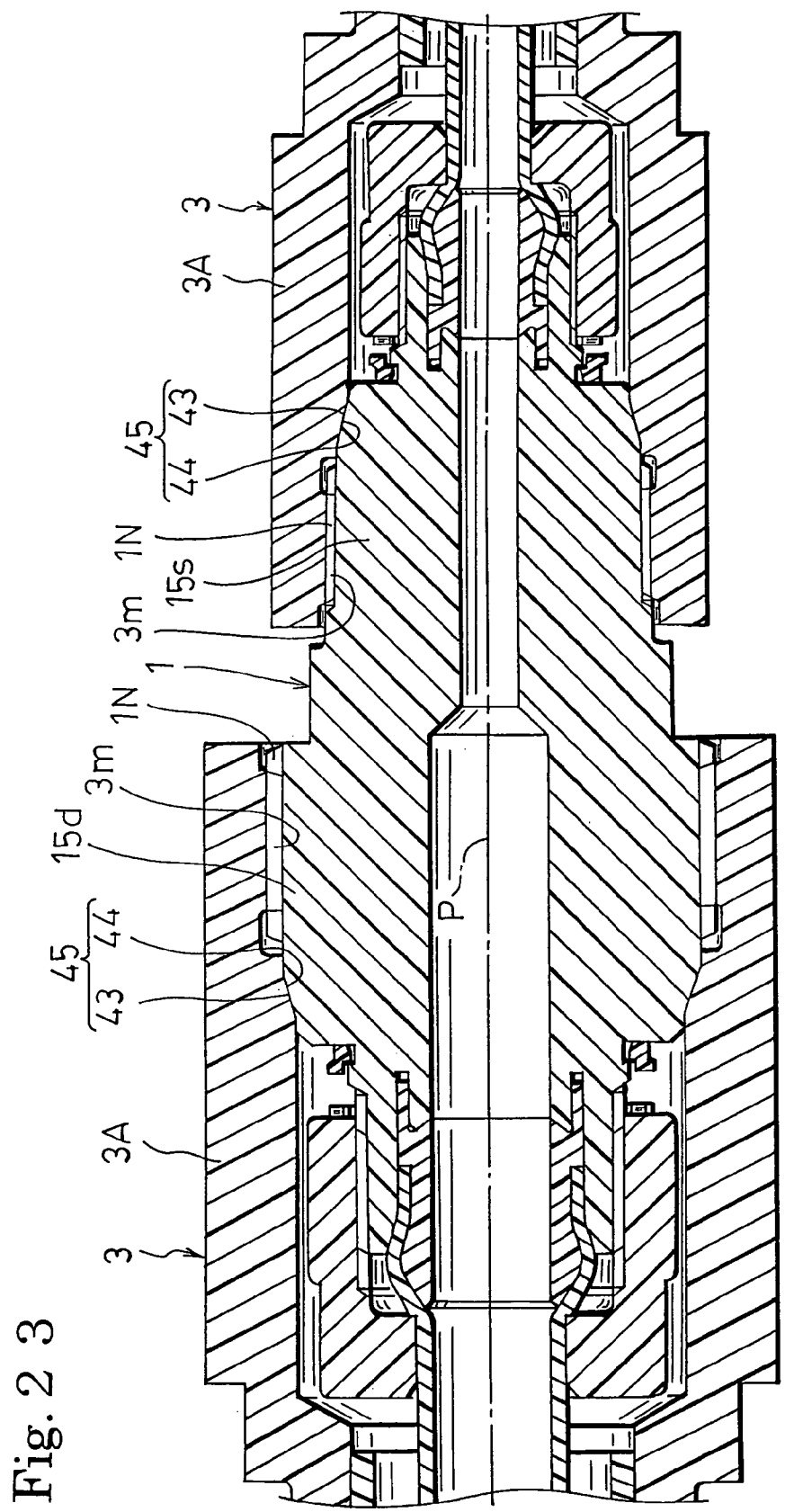
FIG. 23 is a section view showing a main portion of a fifth other sealing structure of the inner and outer joint bodies.

As shown in FIG. 23, the fifth other sealing structure may be a structure in which forward-contracted tapered outer peripheral faces 43 are formed in outer side areas of the external threads 1N of the inner-pipe joint body 1, and forward-expanded tapered inner peripheral faces 44 that butt at the surface against the tapered outer peripheral faces 43 are formed in inner areas of the internal threads 3m of the outer-pipe joint bodies 3, thereby configuring fitting portions 45. The screwing of the outer-pipe joint body 3 to the inner-pipe joint body 1 causes the tapered outer peripheral face 43 and the tapered inner peripheral face 44 to be strongly in surface contact with each other, thereby exerting a sealing function.

[Sixth Other Sealing Structure]

Figure 24:
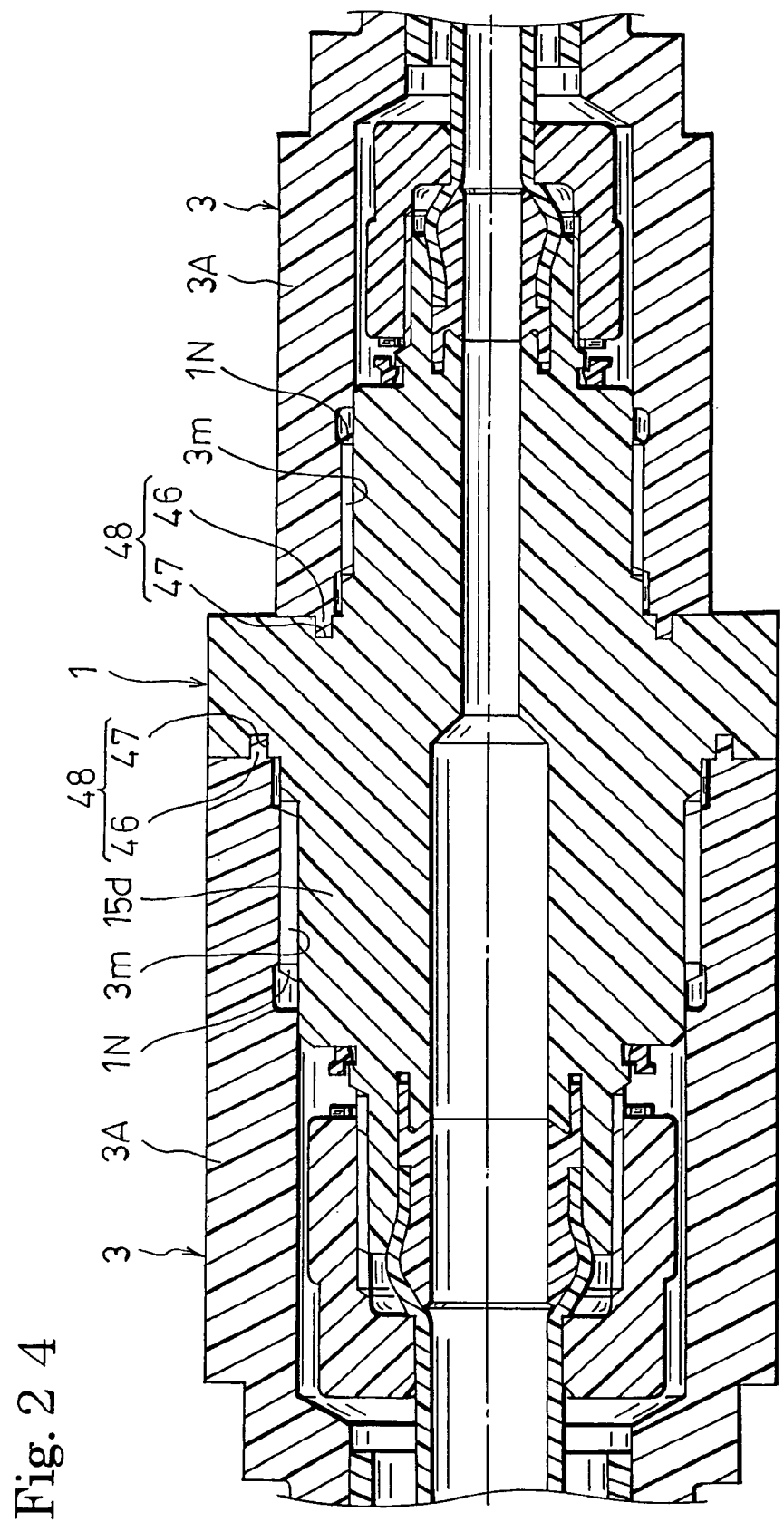
FIG. 24 is a section view showing a main portion of a sixth other sealing structure of the inner and outer joint bodies.

As shown in FIG. 24, the sixth other sealing structure may be a structure in which annular grooves 46 having a rectangular section shape are formed in the stop walls 15E of the inner-pipe joint body 1, and annular protrusions 47 that have a rectangular section shape, that are to be fitted into the annular grooves 46 are formed in end walls of the cover cylinder portions 3A of the outer-pipe joint bodies 3, and fitting portions 48 are formed by the annular grooves 46 and the annular protrusions 47. When the annular grooves 46 and the annular protrusions 47 are finished with a high degree of accuracy in dimensions and surface roughness, sealing is attained by fitting portions 48 in which they are fitted to each other.

[Combination Structure of Double-Pipe Joint, etc.]

In Embodiments 7 to 13, the inner joint portion T1 (t1) constituting the double-pipe joint A is contemplated to have at least three kinds of structures (1: the structure of FIG. 11, 2: the structure of FIG. 13, and 3: the structure of FIG. 14), and the outer joint portion T2 (t2) is contemplated to have at least four kinds of structures (1: the structure of FIG. 12, 2: the structure of FIG. 15, 3: the structure of FIG. 16, 4: the structure of FIG. 17). Therefore, the structure of the double-pipe joint A can be formed in 3×4=12 or more combinations. In the case of the joint for double pipes shown in Embodiment 7, there are one pair of inner joint portions T1 (t1), and one pair of outer joint portion T2 (t2). More correctly, therefore, 12×12=144 or more combinations are possible. Also in the double-pipe joint A shown in Embodiment 14, each of the inner and outer joint portions T1, T2 is contemplated to have 3×4 combinations of structures as described above. Of course, therefore, at least twelve combinations of structures can be obtained. The inner pipes H1, h1 and the outer pipes H2, h2 may have various inner diameters. As shown in FIG. 10 and the like, the inner diameters of the inner and outer pipes H1, h1 and H2, h2 which correspond to each other, and which are paired may have different values or alternatively may have the same values.

The inner and outer joint portions T1, T2 on the large-diameter side, and the inner and outer joint portions t1, t2 on the small-diameter side, i.e., the large joint portion Ad and the small joint portion As are different only in diameter, and are similar to each other as described above. They are identical in shape and function. Therefore, it is interpreted that the small joint portion As in each of embodiments is described by performing replacements of T→t, H→h, K→k, and 15d→15s.

What is claimed is:

1. A double-pipe joint in combination with an inner and outer pipe structure which only passes fluid through said inner pipe and wherein: said double-pipe joint has an inner joint portion and an outer joint portion, said inner joint portion having:

an inner-pipe receiving port for receiving an inner-pipe end portion of an inner-pipe joint body in an inward fitting state;

a cylindrical inner-pipe sleeve which is to be pressingly inserted and fitted into said inner-pipe end portion;

an inner-pipe union nut which is to be fitted onto said inner-pipe end portion, and which is screwable with said inner-pipe receiving port;

an inner-pipe sealing face which is formed in said inner-pipe receiving port; and an inner-pipe sealing portion which is formed by pressing said inner-pipe end portion from an outer side by fastening due to screw advancement of said inner-pipe union nut toward said inner-pipe receiving port, and causing by the pressing function said inner-pipe end portion and said inner-pipe sealing face to be in close contact with each other, said inner joint portion connecting and coupling said inner pipe of a double pipe to said inner-pipe joint body, said double pipe comprising said outer pipe which is made of a synthetic resin, and said inner pipe which is disposed inside said outer pipe, and which is made of a synthetic resin; and said outer joint portion having:

an outer-pipe receiving port for receiving an outer-pipe end portion in an outer-pipe joint body in an inward fitting state;

a cylindrical outer-pipe sleeve which is pressingly inserted and fitted into said outer-pipe end portion;

an outer-pipe union nut which is screwable with said outer-pipe receiving port while being fitted onto said outer-pipe end portion;

an outer-pipe sealing face which is formed in said outer-pipe receiving port; and said outer joint portion connecting and coupling said outer pipe to said outer-pipe joint body with which said inner-pipe union nut is formed integrally.

2. A double-pipe joint according to claim 1, wherein said inner-pipe sleeve has:

a press-insertion portion onto which the end portion of the inner pipe is to be pressingly inserted to increase a diameter of the end portion, thereby expanding the end portion so as to have a mountain shape;

an annular protrusion which is to be pressingly inserted into an annular groove formed in an outer diameter side of a fluid path in said inner-pipe joint body; and a tapered outer peripheral face which is to be in press contact with a forward-expanded tapered inner peripheral face formed in a tip end portion of a cylindrical join end portion that is a portion between said annular groove and said fluid path; and wherein said inner-pipe sealing portion is formed to, by said inner-pipe sealing face configured by a forward-expanded outward taper face formed in a tip end portion of said inner-pipe receiving port, and a forward-expanded inward taper face in said press-insertion portion having a mountain shape, pressingly hold the end portion of said inner pipe in an inclined state between said inner-pipe sealing face and said inward taper face; and wherein said pipe joint further has:

a second inner-pipe sealing portion which is configured in a freely formable manner by fitting between said annular groove and said annular protrusion; and a third inner-pipe sealing portion which is configured in a freely formable manner by pressing contact between said tapered inner peripheral face and said tapered outer peripheral face.

3. A double-pipe joint according to claim 1, wherein said inner-pipe joint body for connecting and coupling double pipes with each other has:

said inner-pipe receiving ports which are formed in ends of said joint body, respectively;

a pair of said inner joint portions which use said inner-pipe receiving ports, respectively; and a pair of said outer joint portions.

* * * * *